United States Patent
Takano

(10) Patent No.: US 12,309,611 B2
(45) Date of Patent: May 20, 2025

(54) BASE STATION DEVICE, APPLICATION FUNCTION NODE, AND COMMUNICATION METHOD

(71) Applicant: Sony Group Corporation, Tokyo (JP)

(72) Inventor: Hiroaki Takano, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 353 days.

(21) Appl. No.: 17/798,313

(22) PCT Filed: Mar. 8, 2021

(86) PCT No.: PCT/JP2021/008897
§ 371 (c)(1),
(2) Date: Aug. 9, 2022

(87) PCT Pub. No.: WO2021/192946
PCT Pub. Date: Sep. 30, 2021

(65) Prior Publication Data
US 2023/0071322 A1      Mar. 9, 2023

(30) Foreign Application Priority Data

Mar. 25, 2020   (JP) ................................ 2020-055128

(51) Int. Cl.
*H04W 4/00*      (2018.01)
*H04W 8/20*      (2009.01)
(Continued)

(52) U.S. Cl.
CPC ............. *H04W 16/28* (2013.01); *H04W 8/20* (2013.01); *H04W 76/10* (2018.02)

(58) Field of Classification Search
CPC ....... H04W 16/28; H04W 8/20; H04W 76/10; H04W 76/36; H04B 7/0617
See application file for complete search history.

(56) References Cited

U.S. PATENT DOCUMENTS 10,728,952 B2 *  7/2020  Dao ...................... H04L 41/342
10,805,874 B1 *  10/2020  Manganiello ....... H04W 84/047
(Continued)

FOREIGN PATENT DOCUMENTS

| JP | 2015-119392 A | 6/2015 |
| JP | 2019-537334 A | 12/2019 |
| JP | 2020-504518 A | 2/2020 |

OTHER PUBLICATIONS

International Search Report and Written Opinion mailed on Jun. 1, 2021, received for PCT Application PCT/JP2021/008897, filed on Mar. 8, 2021, 9 pages including English Translation.
(Continued)

*Primary Examiner* — Stephen M D Agosta
(74) *Attorney, Agent, or Firm* — XSENSUS LLP

(57) ABSTRACT

A base station device (20) includes a control unit (23). The control unit (23) performs operations including: receiving an acquisition request, which is a request for acquiring beam information related to a PDU session established with a terminal device (40); and
transmitting beam group information including at least one piece of the beam information, the transmission being performed in association with the PDU session in response to the acquisition request.

10 Claims, 17 Drawing Sheets

| CSI report number | CSI fields |
|---|---|
| CSI report #n | CRI or SSBRI #1, if reported |
| | CRI or SSBRI #2, if reported |
| | CRI or SSBRI #3, if reported |
| | CRI or SSBRI #4, if reported |
| | SINR #1, if reported |
| | Differential SINR #2, if reported |
| | Differential SINR #3, if reported |
| | Differential SINR #4, if reported |

(51) Int. Cl.
    *H04W 16/28*     (2009.01)
    *H04W 76/10*     (2018.01)

(56) References Cited

U.S. PATENT DOCUMENTS

| | | | |
|---|---|---|---|
| 11,153,929 B2* | 10/2021 | Dao | H04W 36/0033 |
| 11,974,350 B2* | 4/2024 | Dao | H04W 76/10 |
| 2017/0366981 A1* | 12/2017 | Takano | H04B 7/0469 |
| 2018/0198867 A1* | 7/2018 | Dao | H04W 36/0016 |
| 2018/0368205 A1* | 12/2018 | Park | H04W 76/32 |
| 2019/0013883 A1* | 1/2019 | Tercero Vargas | H04B 7/0413 |
| 2019/0053193 A1* | 2/2019 | Park | H04W 76/11 |
| 2020/0022043 A1* | 1/2020 | Pelletier | H04W 36/04 |
| 2020/0059290 A1* | 2/2020 | Pan | H04W 24/10 |
| 2020/0059983 A1* | 2/2020 | Stauffer | H04W 76/12 |
| 2020/0252837 A1* | 8/2020 | Kim | H04M 15/8044 |
| 2020/0314950 A1* | 10/2020 | Dao | H04L 67/148 |
| 2020/0336937 A1* | 10/2020 | Youn | H04W 76/12 |
| 2021/0144579 A1* | 5/2021 | Ke | H04W 76/12 |
| 2021/0168584 A1* | 6/2021 | Li | H04W 60/00 |
| 2021/0377814 A1* | 12/2021 | Sillanpaa | H04W 72/04 |
| 2022/0039197 A1* | 2/2022 | Dao | H04L 41/5019 |

OTHER PUBLICATIONS

Intel Corporation, "(TP for NR_Mob_enh-Core BL CR for TS 38.300): Support for per DRB DAPS", 3GPP TSG RAN WG3 #107_e, R3-201105, Feb. 24-Mar. 6, 2020, 10 pages.

* cited by examiner

| CSI report number | CSI fields |
|---|---|
| CSI report #n | CRI or SSBRI #1, if reported |
| | CRI or SSBRI #2, if reported |
| | CRI or SSBRI #3, if reported |
| | CRI or SSBRI #4, if reported |
| | SINR #1, if reported |
| | Differential SINR #2, if reported |
| | Differential SINR #3, if reported |
| | Differential SINR #4, if reported |

| Beam Group USED BY PDU SESSION ID OR NGU Tunnel ID=i ||
|---|---|
| Beam ID | PROBABILITY OF USING BEAM |
| Beam 2 | 70% |
| Beam 4 | 20% |
| Beam 15 | 10% |

FIG.13

| Beam Group USED BY PDU SESSION ID OR NGU Tunnel ID=i ||
|---|---|
| Beam ID | PROBABILITY OF USING Beam |
| Beam 2 | 1 |
| Beam 4 | 4 |
| Beam 15 | 5 |

FIG.14

| Beam Group USED BY PDU SESSION ID OR NGU Tunnel ID=i ||
|---|---|
| Time from session establishment | Y [hour] |
| Beam ID | PROBABILITY OF USING Beam |
| Beam 2 | 70% |
| Beam 4 | 20% |
| Beam 15 | 10% |

FIG.15

| Beam Group USED BY PDU SESSION ID OR NGU Tunnel ID=i ||
|---|---|
| Monitoring term | Latest Z [hour] |
| Beam ID | PROBABILITY OF USING Beam |
| Beam 2 | 70% |
| Beam 4 | 20% |
| Beam 15 | 10% |

FIG.16

| Items | Value |
|---|---|
| Number of beams for the report | 10 |
| Lower limit of usage probability | 20% |
| Monitoring period | 3 hours |

| | Key | Value |
|---|---|---|
| 1 | PDU Session ID | 1 |
| 2 | NG-U Tunnel ID | 3 |
| 3 | PDU Session ID + QFI | 1,2 |
| 4 | 5-tuple OF IP, e.g. Destination IP Address/port, Source IP Address/port. | 192.168.1,20,192.168.1.70 |
| 5 | S-NSSI (Network Slice ID) | 1,2,3,5,10 |

FIG.23

| Input | Output |
|---|---|
| PDU Session ID | Beam ID (Beam ID Group) |

FIG.24

| Input | Output |
|---|---|
| SUPI | PDU Session ID |

FIG.25

| Input | Output |
|---|---|
| SUPI | Beam ID (Beam ID Group) |

FIG.26

| Beam Group USED BY SUPI OR IMSI ||
|---|---|
| SUPI | 1 |
| Monitoring term | Latest Z [hour] |
| Beam ID | PROBABILITY OF USING Beam |
| Beam 2 | 70% |
| Beam 4 | 20% |
| Beam 15 | 10% |

BASE STATION DEVICE, APPLICATION FUNCTION NODE, AND COMMUNICATION METHOD

CROSS-REFERENCE TO RELATED APPLICATIONS

The present application is based on PCT filing PCT/JP2021/008897, filed Mar. 8, 2021, which claims priority to JP 2020-055128, filed Mar. 25, 2020, the entire contents of each are incorporated herein by reference.

FIELD

The present disclosure relates to a base station device, an application function node, and a communication method.

BACKGROUND

Various radio access methods and radio networks in cellular mobile communications (hereinafter, "Long Term Evolution (LTE)", "LTE-Advanced (LTE-A)", "LTE-Advanced Pro (LTE-A Pro)", "Fifth Generation (5G)", "New Radio (NR)", "New Radio Access Technology (NRAT)", "Evolved Universal Terrestrial Radio Access (EUTRA)", or "Further EUTRA (FEUTRA)") are under examination in Third Generation Partnership Project (3GPP). In the following description, LTE includes LTE-A, LTE-A Pro, and EUTRA, and NR includes NRAT and FEUTRA. In LTE and NR, a base station device (base station) is also referred to as an evolved NodeB (eNodeB) in LTE and a gNodeB in NR, while a terminal device (mobile station, mobile station device, or terminal) is also referred to as user equipment (UE). LTE and NR are cellular communication systems that arrange a plurality of areas covered by the base station, as cellular areas. A single base station may manage a plurality of cells.

In addition, for example, in a radio communication system in which beamforming is performed by a plurality of base station devices, there is a known base station device that orients a null in a direction other than a beam when transmitting the beam (refer to Patent Literature 1, for example).

CITATION LIST

Patent Literature

Patent Literature 1: JP 2015-119392 A

SUMMARY

Technical Problem

In the above technique, the base station device orients a null in a direction other than the beam so as to suppress interference with a terminal device other than a terminal device that performs communication, but there is no consideration of the possibility that the beam itself may interfere with another terminal device. Therefore, there has been a possibility of occurrence of inter-beam interference in which a beam transmitted by a base station device interferes with the communication between another base station device and the terminal device.

In view of this, the present disclosure provides a mechanism capable of suppressing inter-beam interference.

Solution to Problem

According to the present disclosure, a base station device is provided. The base station device includes a control unit. The control unit performs operations including: receiving an acquisition request, which is a request for acquiring beam information related to a PDU session established with a terminal device; and transmitting beam group information including at least one piece of the beam information, the transmission being performed in association with the PDU session in response to the acquisition request.

BRIEF DESCRIPTION OF DRAWINGS

FIG. 13 is a diagram illustrating another example of beam group information disclosed by the base station device according to the embodiment of the present disclosure using an API.

FIG. 14 is a diagram illustrating another example of beam group information disclosed by the base station device according to the embodiment of the present disclosure using an API.

FIG. 15 is a diagram illustrating another example of beam group information disclosed by the base station device according to the embodiment of the present disclosure using an API.

FIG. 16 is a diagram illustrating an example of configuration of beam group information set by an AF node according to the embodiment of the present disclosure.

FIG. 23 is a diagram illustrating an example of information held by the base station device according to the embodiment of the present disclosure.

FIG. 24 is a diagram illustrating an example of information held by an SMF node according to the embodiment of the present disclosure.

FIG. 25 is a diagram illustrating an example of information generated by an AF node according to the embodiment of the present disclosure.

FIG. 26 is a diagram illustrating an example of information generated by an AF node according to the embodiment of the present disclosure.

DESCRIPTION OF EMBODIMENTS

Figure 1:
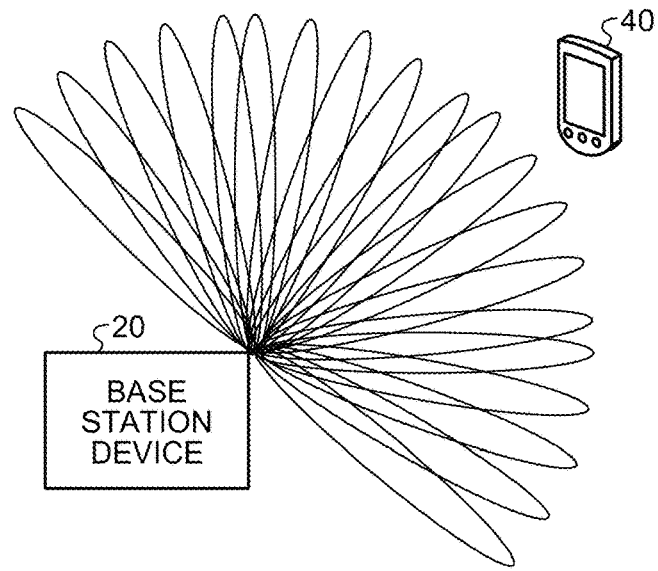
FIG. 1 is a diagram illustrating a beam used by a base station device.

A preferred embodiment of the present disclosure will be described in detail hereinbelow with reference to the accompanying drawings. Note that redundant descriptions will be omitted from the present specification and the drawings by assigning the same reference signs to components having substantially the same functional configuration.

Note that the description will be provided in the following order.
1. Introduction
   1.1. Local cellular network
   1.2. Comparison with Wi-Fi communication
   1.3. Beam sweeping process
   1.4. Inter-beam interference
2. Technical Issues
3. Communication System
   3.1. Outline of interference control
   3.2. Configuration example of communication system
   3.3. Configuration example of AF node
   3.4. Configuration example of base station device
   3.5. Configuration example of terminal device
4. Technical Features
   4.1. Output of beam information by base station device
   4.2. Designation of output information
   4.3. Beam ID
   4.4. Associating SUPI with beam ID
   4.5. Interference control
5. Other Embodiments
6. Supplementary Notes <<1. Introduction>>
<1.1. Local Cellular Network>

In recent years, technology related to a local cellular network (for example, local 5G) has attracted attention. The local cellular network is a network that provides a cellular communication service in a limited area such as a factory, an office, a studio, a hospital, or a university, for example. By limiting the cellular service to a local area, there can be an advantage effect of being able to provide customized cellular services. Here, the local cellular network may broadly include modes such as networks referred to as a private network or a non-public network.

In use cases of a local cellular network, there may be, within a local area of the network, some critical communications that are desired to be protected with higher priority over other communications. For example, there may be, in a factory, a device that should definitely avoid communication failure in order to ensure a production line of the factory. In addition, communication used for surgery, in a hospital, needs to avoid occurrence of communication failures. In a case of performing online class distribution in a university, the distribution is considered to be the communication to be protected with higher priority over other communications. In this manner, the communication in the local area often include specific communication that is highly critical and should be protected with higher priority other communications.

<1.2. Comparison with Wi-Fi Communication>

In the past, communication based on local network standards such as 802.11 a, b, g, n, and ac, also referred to as Wi-Fi communication, has been used as communication in a local area. Although Wi-Fi communication can achieve good performance, the access point does not have a scheduler to coordinate resources between different users (terminal devices). Therefore, in the Wi-Fi communication, traffic between users is multiplexed by a contention-based method based on carrier sensing referred to as the Listen Before Talk mechanism. Wi-Fi communication is suffered from frequent occurrence of packet collisions. Therefore, in order to maintain communication quality even with a plurality of users, there is a request for using cellular communication instead of Wi-Fi communication even in a local area.

<1.3. Beam Sweeping Process>

Figure 2:
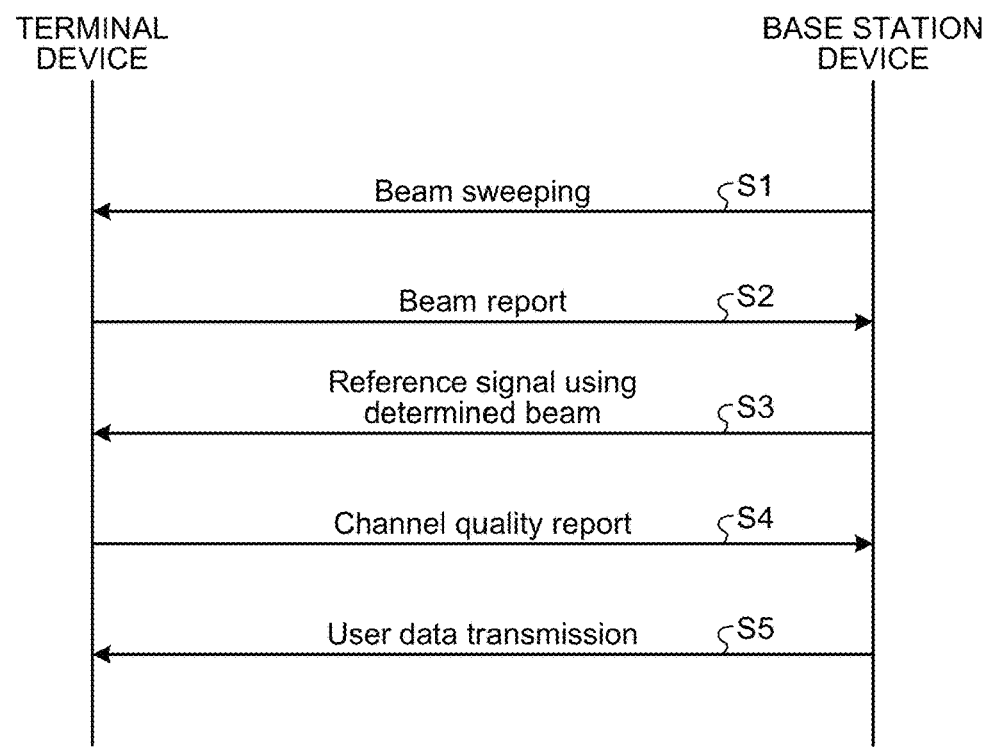
FIG. 2 is a sequence diagram illustrating a beam sweeping process.

5G includes execution of beamforming by a base station device. First, beamforming by the base station device will be described with reference to FIGS. 1 and 2. FIG. 1 is a diagram illustrating a beam used by a base station device. FIG. 2 is a sequence diagram illustrating the beam sweeping process.

As illustrated in FIG. 1, a base station device 20 forms a plurality of beams. Therefore, when communicating with a terminal device 40 using beamforming, the base station device 20 first executes the beam sweeping process. The beam sweeping process is a process for determining a desirable beam between the base station device 20 and the terminal device 40.

The beam sweeping process performed between the base station device 20 and the terminal device 40 will be described with reference to FIG. 2. In FIG. 2, the terminal device corresponds to the terminal device 40, and the base station device corresponds to the base station device 20.

As illustrated in FIG. 2, the base station device 20 transmits a beam while performing sweeping (step S1). Next, the terminal device 40 measures the reception power of the transmission beam, and transmits, to the base station device 20, a beam report including information regarding a beam desired as a transmission beam based on the measurement result (step S2).

Based on the beam report, the base station device 20 transmits a reference signal to the terminal device 40 using the determined transmission beam (step S3). The terminal device 40 reports the channel quality measured based on the reference signal to the base station device 20 (step S4).

Based on the reported channel quality, the base station device 20 transmits the user data to the terminal device 40 using the determined transmission beam (step S5).

<1.4. Inter-Beam Interference>

Figure 3:
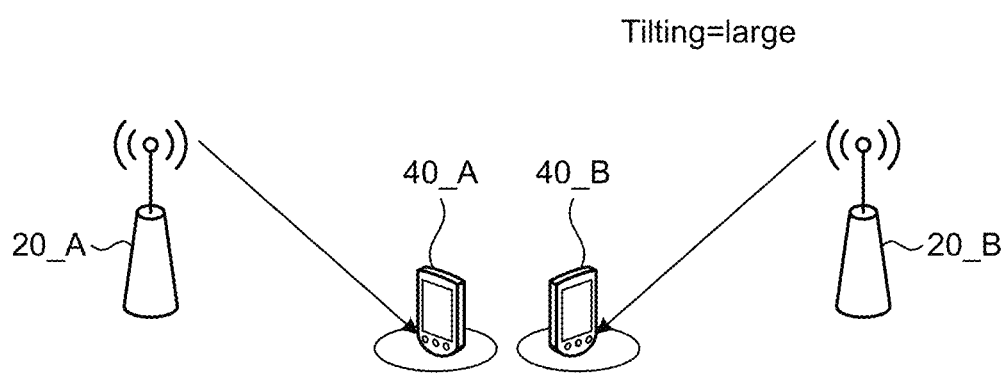
FIG. 3 is a diagram illustrating an example of beamforming by a base station device of a public network.
Figure 4:
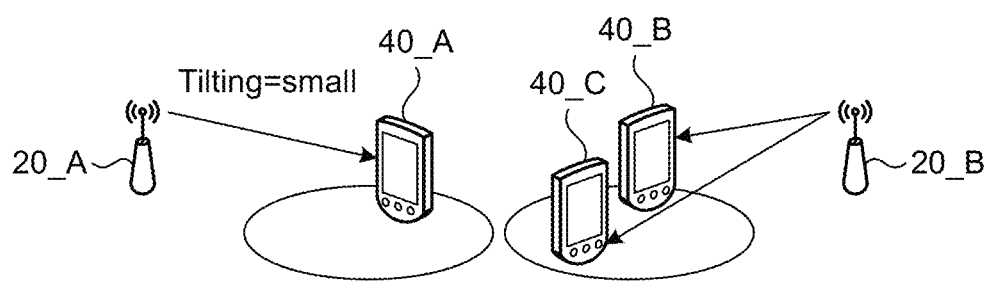
FIG. 4 is a diagram illustrating an example of beamforming by a base station device of a local cellular network.

As described above, when the base station device 20 performs beamforming, there is a problem of inter-beam interference due to beams transmitted by a plurality of base station devices 20. Such inter-beam interference will be described with reference to FIGS. 3 and 4. FIG. 3 is a diagram illustrating an example of beamforming by the base station device 20 of a public network. FIG. 4 is a diagram illustrating an example of beamforming by the base station device 20 of a local cellular network.

As illustrated in FIG. 3, for example, in a public network for outdoor use, antennas of the base station devices 20 are installed at high positions in order to avoid inter-beam interference, and the network is controlled so as to avoid occurrence of interference between the beams transmitted from adjacent base station devices 20_A and 20_B to the terminal devices 40_A and 40_B, respectively. Installing the antenna of the base station device 20 at a high position increases an angle (tilting) of the antenna of the base station device 20 with respect to the terminal device 40 at lower positions, resulting in small interference with an adjacent cell.

On the other hand, as illustrated in FIG. 4, for example, in a local cellular network for indoor use, the antenna of the base station device 20 may not be installed at a high position. This might result in a small angle (tilting) of the antenna of the base station device 20 with respect to the terminal device 40 at a lower position, causing the transmission beam also to reach the terminal device 40 of the adjacent cell, leading to an occurrence of interference.

More specifically, when the base station device 20 uses a beam for transmission, the reception intensity for the transmission beam at the terminal device 40 is not simply determined by the distance between the base station device 20 and the terminal device 40, but also changes depending on the beam direction. Therefore, the amount of interference given to the terminal device 40 of the adjacent cell changes depending on the direction of the beam transmitted by the base station device 20.

For example, the transmission beam from the base station device 20_A in FIG. 4 reaches not only the terminal device 40_A as a communication partner but also the terminal device 40_C of the adjacent cell, increasing the interference amount. In contrast, the terminal device 40_B, which is not located in the direction of the transmission beam of the base station device 20_A, is not likely to receive the transmission beam of the base station device 20_A, resulting in a small amount of interference given from the base station device 20_A to the terminal device 40_B. In this manner, even in the terminal devices 40_B and 40_C belonging to the same neighboring cell, the amount of interference varies depending on the direction of the transmission beam of the base station device 20_A.

The attenuation amount of the beam varies depending on the beam width. The narrower, the beam width, the less the energy is dispersed, which allows the beam to arrive at a distant position. For example, when the base station device 20_A in FIG. 4 uses a beam having a narrow beam width to transmit a signal to the terminal device 40_A, a transmission beam with high reception intensity reaches the terminal device 40_C in an adjacent cell, leading to a possibility of occurrence of significant interference to the terminal device 40_C. Note that the attenuation amount of the beam also varies depending on the frequency. Specifically, the higher the beam, the more the attenuation amount, cancelling the advantages of the gain of the beam. In this manner, whether interference occurs on the terminal device 40_C other than the communication partner is related to the direction and width of the beam transmitted by the base station device 20_A rather than the distance from the base station device 20_A, making it difficult to perform proper interference control.

As described above, there is a high possibility, in a local cellular network, of interference having a large influence on communication than before although there may be very critical communication to be protected. This is because, as described above, communication is performed by using a beam in a local cellular network.

Therefore, it is necessary to suppress inter-beam interference of the base station device 20 to protect critical communication.

<<2. Technical Issues>>

Here, issues to be handled for suppressing inter-beam interference of the base station device 20 and protecting a PDU session critical for the system will be examined.

For example, here is an assumable case where interference control processing for suppressing inter-beam interference is executed in the base station device 20 in the above-described communication system. As described above, the base station device 20 acquires, from the terminal device 40, information regarding an interfering beam that interferes with a specific beam transmitted from the base station device 20. This may make it possible for the base station device 20 to execute the interference control processing by determining a combination of beams to be simultaneously used with another base station device 20. The base station device 20 is connected to an entity (node) of a core network that handles a packet of a user, specifically, a node such as a 5G UPF (SGW or PGW in the case of 4G), and manages a PDU session (PDN connection or EPS bearer in the case of 4G) with the entity. Each PDU session is provided with QoS. With reference to the QoS, the base station device 20 can acquire information indicating which PDU session is critical.

Therefore, it may be possible, in one base station device 20, to achieve a state in which the base station device 20 does not use beams other than beams used for transmission and reception of PDU sessions provided with critical QoS. With implementation of the base station device 20 in this manner, it is possible to protect a beam used for a PDU session provided with critical QoS against a beam used for transmission and reception of a PDU session provided with low QoS (for example, suppressing the interference from the interferer).

However, in a case where the base station device 20 that transmits the beam used for the PDU session to be protected is different from the base station device 20 that transmits the interfering beam, there is a possibility that interference cannot be suppressed only by beam control in one base station device 20 as described above.

In this case, for example, the base station device 20A transmits a desired beam to the terminal device 40A. In addition, beams as candidate for the interference on the desired beam (hereinafter, also referred to as a candidate beam) can be transmitted from the base station device 20B and reach the terminal device 40A. At this time, by setting the frequency and time resources for the desired beam and the candidate beam in advance, the terminal device 40A can notify the base station device 20A of radio quality (for example, SINR) in a case where the candidate beam interferes with the desired beam. The base station device 20A that has received the notification from the terminal device 40A may be able to perform interference control between different base station devices 20 by requesting the base station device 20B to stop using the candidate beam.

However, interference control between different base station devices 20 performed by the above-described base station device 20A depends on implementation. Therefore, for example, when there are base station devices 20 of various manufacturers, it would become difficult to perform interference control between the different base station devices 20.

Alternatively, for example, even when the base station devices 20 belonging to different business operators exist in an identical area, it is difficult for the base station devices 20 to perform interference control between the different base station devices 20. For example, here is an assumable case where there are different public land mobile networks (PLMNs) in an identical local area, and each PLMN shares a same frequency. In this case, it is difficult to process interference between different PLMNs in the gNodeB/TRP which is defined as a RAN level. Therefore, in order to protect a critical PDU session across different PLMNs, it is considered that the function of protecting the beam used for the PDU session from interference needs to be adjusted at the Application Level.

In addition, in a case where interference control is performed between different base station devices 20, there may be a problem of whether the base station device 20 can determine a beam to be protected. As described above, the base station device 20 can grasp the correspondence between the beam transmitted by its own device and the PDU session. Furthermore, the base station device 20 can acquire the information of the PDU session as the information referred to as QoS.

However, the conventional QoS alone may be insufficient as information for determining stop of the interfering beam. Furthermore, the base station device 20 does not know the relationship between the transmission beams of another base station device 20 and the QoS. Therefore, there is a possibility, for example, that a beam requested to be stopped by another base station device 20 is a beam to be used for a PDU session to be protected by the another base station device 20. In this manner, it may be difficult to determine the beam to be stopped only by the base station device 20.

On the other hand, the conventional core network has had no means of obtaining information in which a PDU session and a beam are associated with each other. In addition, the base station device 20 has had no means of notifying the node at the application level on the core network side of the information in which the PDU session and the beam are associated with each other. Therefore, the conventional local cellular network has had no means of suppressing interference at the Application Level by using information in which a PDU session and a beam are associated with each other.

Therefore, the present disclosure proposes a mechanism for suppressing interference at the Application Level in order to solve the problem of inter-beam interference in a local cellular network. In other words, the present disclosure proposes a mechanism in which interference control is performed at an AF node by providing beam information from the base station device 20 to the AF node.

<<3. Communication System>>
<3.1. Outline of Interference Control>

Figures 5, 6:
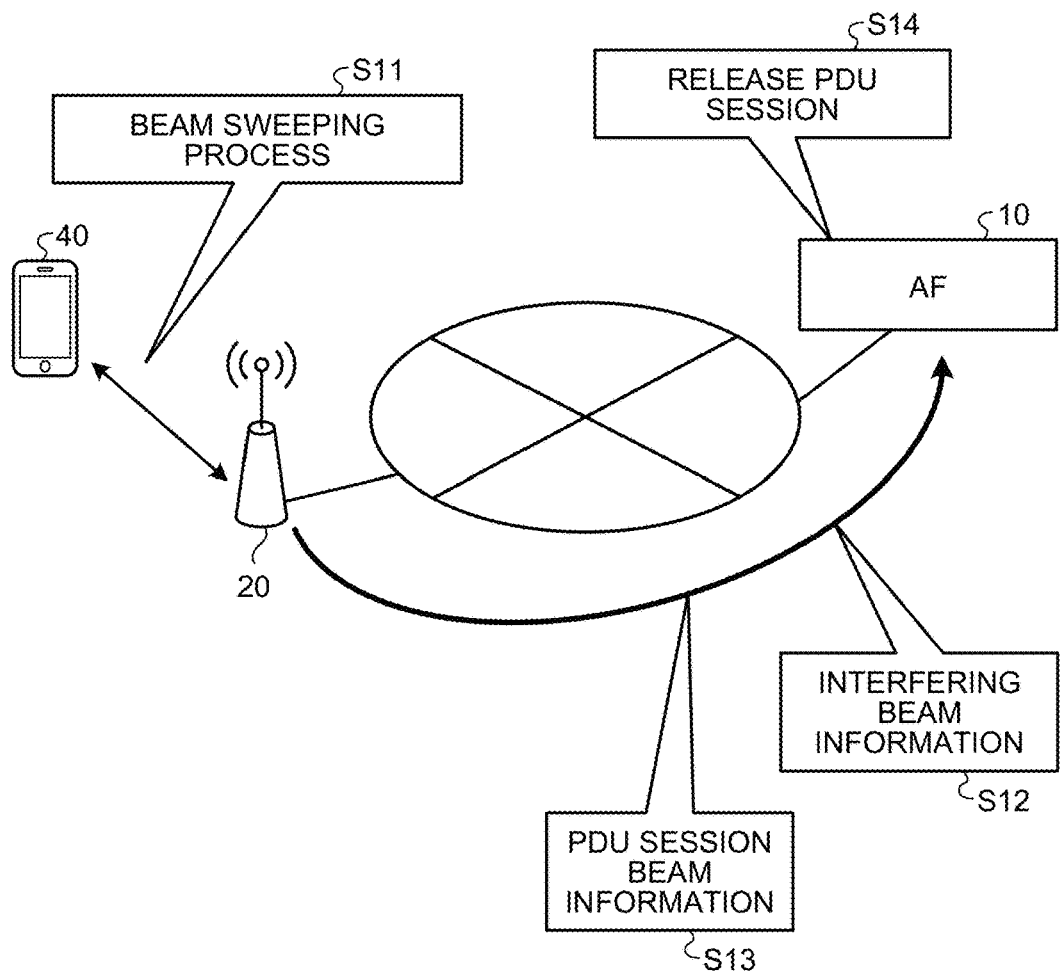
FIG. 5 is a diagram illustrating an outline of interference control according to an embodiment of the present disclosure.
FIG. 6 is a diagram illustrating an example of a format of SSBRI/CRI reported from a terminal device to a base station device.

Therefore, the embodiment of the present disclosure performs interference control of suppressing inter-beam interference so as to avoid hindrance of critical communication by interference. An outline of interference control according to the embodiment of the present disclosure will be described with reference to FIG. 5. FIG. 5 is a diagram illustrating an outline of interference control according to an embodiment of the present disclosure.

As illustrated in FIG. 5, the communication system according to the embodiment of the present disclosure includes a base station device 20, a terminal device 40, and an application function (AF) node 10. In the present embodiment, the AF node 10 of the local cellular network performs interference control. By executing interference control by the AF node 10 in this manner, a local cellular network operator can more easily control inter-beam interference.

Furthermore, in the present embodiment, as described above, the base station device 20 and the terminal device 40 perform radio communication using a beam. Furthermore, the base station device 20 and the AF node 10 are connected to each other via a core network.

In the interference control of the present disclosure, a first step is to perform a beam sweeping process between the base station device 20 and the terminal device 40 (step S11). At this time, the terminal device 40 reports, to the base station device 20, information regarding a beam having large interference with the desired beam (hereinafter, also referred to as an interfering beam) in addition to information regarding a beam desired for use in communication (hereinafter, also referred to as a desired beam). Such points will be described below.

As described with reference to FIGS. 1 and 2, in the beam sweeping process, the terminal device 40 reports a beam having high reception power to the base station device 20 as a desired beam. In addition, it is considered, in 3GPP Rel 16, to report an interfering beam largely interfering with a desired beam together with the desired beam. The base station that has obtained the report of the desired beam and the interfering beam can specify a beam largely interfering with the desired beam.

Basically, the terminal device 40 determines a desired beam from among beams transmitted by the base station device 20 being a communication partner, and determines one or a plurality of interfering beams serving as interference source(s) to affect the determined desired beam. Note that the interfering beam is a beam transmitted by the base station device 20 other than the communication partner (hereinafter, also referred to as another base station device 20). In addition, the number of interfering beams determined by the terminal device 40 is designated by the base station device 20, for example. The terminal device 40 notifies the base station device 20 of the SINR of the determined interfering beam. FIG. 6 illustrates an example of a format of SSBRI/CRI reported from the terminal device 40 to the base station device 20. FIG. 6 is a diagram illustrating an example of the format of SSBRI/CRI reported from the terminal device 40 to the base station device 20. The format in FIG. 6 is described in 3GPP Rel 16.

In this manner, the base station device 20 can determine at least one beam to be protected (more particularly, the desired beam designated by CRI) and at least one beam that can interfere with the beam to be protected, and can receive a report on the SINR of the determined beam from the terminal device 40. Accordingly, in the communication system according to the present embodiment, the AF node 10 performs interference control by using information regarding the beam. Such points will be described below.

Returning to FIG. 5. As described above, the base station device 20 acquires information regarding the desired beam and the interfering beam from the terminal device 40 by the beam sweeping process in step S11.

The AF node 10 acquires information regarding the interfering beam from the base station device 20 (step S12). Along with this, the AF node 10 acquires beam information regarding a beam (desired beam) used for communication with the terminal device 40 from the base station device 20 in association with such communication (for example, PDU session) (step S13). In this manner, the AF node 10 acquires information regarding the beam (for example, a desired beam and an interfering beam) associated with the PDU session from the base station device 20 using an application programming interface (API), for example. The AF node 10 may obtain information regarding beams associated with PDU sessions (for example, a desired beam and an interfering beam) via a core network node (for example, UPF, AMF, or SMF). For example, the base station device 20 transmits information regarding beams associated with the PDU session (for example, a desired beam and an interfering beam) to the core network node (for example, UPF, AMF, or SMF). The core network node may disclose information regarding a beam associated with the PDU session (for example, a desired beam and an interfering beam) as an API. The AF node 10 may obtain information regarding a beam associated with a PDU session (for example, a desired beam and an interfering beam) from the core network node by using the API. The information regarding the beam associated with the PDU session includes beam group information including at least one piece of beam information (or interfering beam information). Details of the beam group information will be described below.

Based on the obtained interfering beam information and beam information, the AF node 10 determines a PDU session for which communication is to be maintained and a PDU session for which communication is to be released, and then releases the PDU session for which communication is determined to be released (step S14). For example, the AF node 10 determines a critical PDU session as a PDU session for which communication is to be maintained. In addition, the AF node 10 determines a PDU session that uses an interfering beam that interferes with a desired beam used for the PDU session for which communication is to be maintained, as the PDU session for which communication is to be released. For example, the AF node 10 releases the PDU session by transmitting a release request of the PDU session determined to be released to a core network node (for example, UPF, AMF, or SMF) and/or the base station device 20 by using an API (for example, Nsmf_PDUSession Release service operation).

In this manner, in the embodiment of the present disclosure, the base station device 20 transmits information regarding the beams associated with the PDU session. This makes it possible for the AF node 10 to determine a PDU session to be released or maintained, leading to suppression of inter-beam interference caused by the base station device 20.

Incidentally, there is a proposed technique of determining whether a secondary system can perform communication in vacant time period of a prioritized network referred to as a primary system. There is a proposed technique, in such a system, related to beam interference control of determining whether the beam used in the secondary system affects communication of the primary system.

However, the technology related to the beam interference control described above performs coordination between beams used for two systems, namely, the primary system and the secondary system. In this respect, the beam interference control is different from the beam interference control of the communication system of the present embodiment which is intended to perform coordination between beams used in the same system. In addition, in order to protect a specific critical PDU session, the communication system according to the present embodiment protects the beam that can be used for the PDU session against interference. Furthermore, the communication system according to the present embodiment performs beam interference control using an API of a core network as described below. This point is also different from the beam interference control in the primary system and the secondary system.

As described above, the conventional local cellular network system has had no means of suppressing inter-beam interference in cooperation with the core network. In view of this, in the communication system according to the embodiment of the present disclosure, the AF node 10 acquires beam information corresponding to the PDU session from the base station device 20 or the core network node. With this configuration, based on the interfering beam information and the obtained beam information, the AF node 10 can request to stop using beams of other PDU sessions in order to maintain communication quality of a specific PDU session, making it possible to suppress inter-beam interference. Note that, the communication between the AF node 10 and the base station device 20 or the core network node can use an API, for example, as described below.

<3.2. Configuration Example of Communication System>

Figure 7:
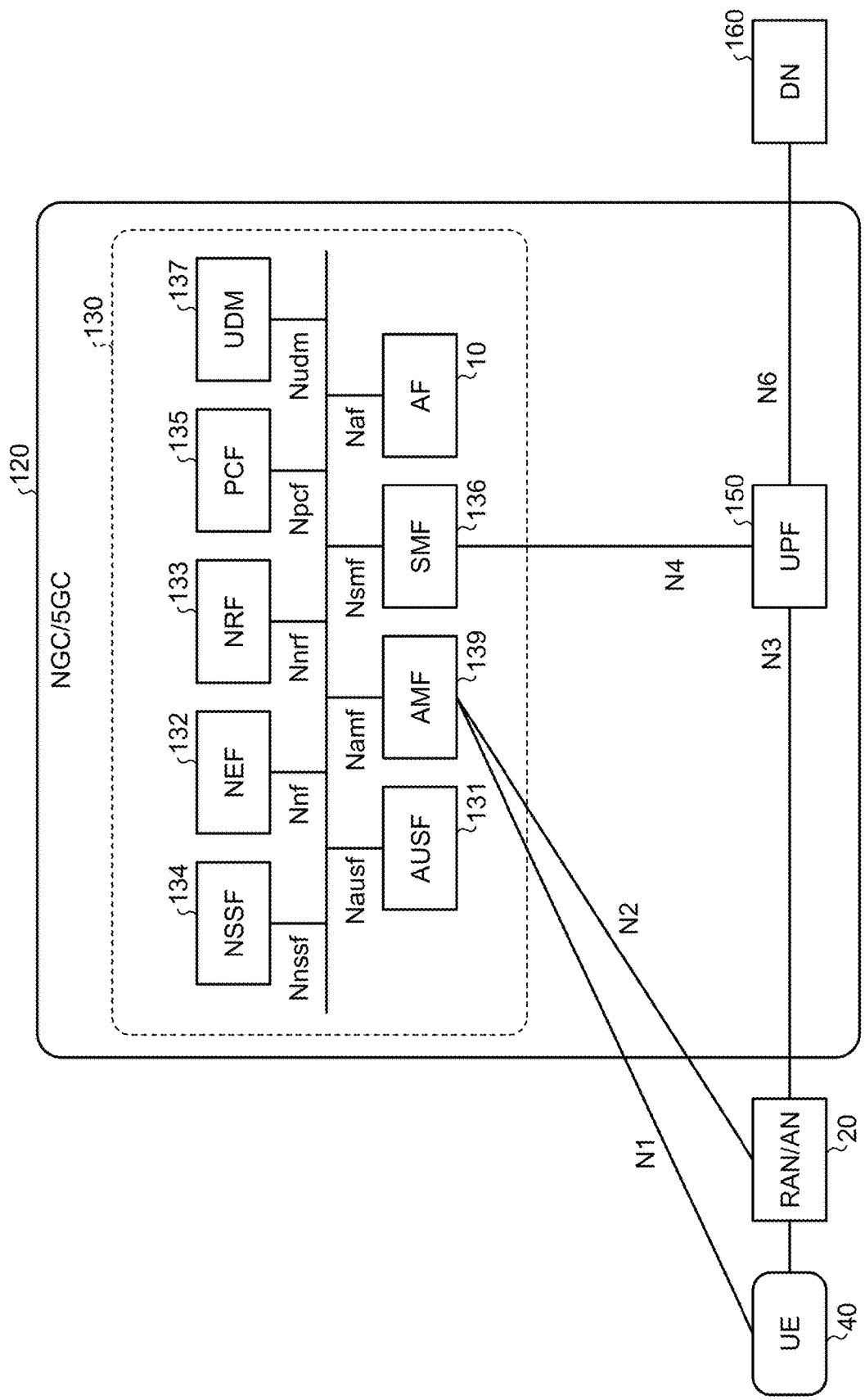
FIG. 7 is a diagram illustrating a configuration example of a communication system according to the embodiment of the present disclosure.

Next, a configuration example of a communication system according to the embodiment of the present disclosure will be described. FIG. 7 is a diagram illustrating a configuration example of the communication system according to the embodiment of the present disclosure. The communication system according to the present embodiment is the local cellular network system described above. Here, a case where the communication system is the fifth generation (5G) mobile communication system will be described in the present embodiment, but the type of communication system is not limited thereto. The communication system according to the present embodiment may be another mobile communication system such as LTE.

The cellular network system of the communication system according to the present embodiment includes a radio access network (RAN) and a core network (CN). The RAN is a radio system between the base station device 20 and the terminal device 40. The CN mainly performs permission and session management when the terminal device 40 connects to the cellular network. Also in 4G and 5G, the CN includes a control plan function and a user plane function.

As illustrated in FIG. 7, the communication system according to the present embodiment includes a 5G core network 120, a base station device (RAN/AN) 20, a terminal device (UE) 40, and a DN node 160.

The RAN/AN 20 has a function of connecting to a radio access network (RAN) and connecting to an access network (AN) other than the RAN. The RAN/AN 20 includes a base station device referred to as a gNB or an ng-eNB.

The 5G core network 120 is also referred to as 5G Core (5GC)/Next Generation Core (NGC). Hereinafter, the 5G core network 120 is also referred to as a 5GC/NGC 120. The 5GC/NGC 120 is connected to user equipment (UE) 40 via the RAN/AN 20.

The 5GC/NGC 120 includes a user plane function (UPF) node 150 and a control plane function group 130.

The UPF node 150 is a network function (NF) node which is critical in the user plane function. The UPF node 150 has a function of user plane processing. The UPF node 150 includes a routing/forwarding function of data handled in the user plane.

The UPF node 150 and the Data Network (DN) node 160 may be combined as a user plane function group. In this case, the DN node 160 is included in the 5GC/NGC 120. The DN node 160 has a function of connecting to a service provided by a cellular service provider, the Internet, or a third party service.

The control plane function group 130 includes an access management function (AMF) node 139, a session management function (SMF) node 136, an authentication server function (AUSF) node 131, a network slice selection function (NSSF) node 134, a network exposure function (NEF) node 132, a network repository function (NRF) node 133, a policy control function (PCF) node 135, a unified data management (UDM) node 137, and an AF node 10.

The AMF node 139 has functions such as registration processing, connection management, and mobility management regarding the UE 40. For example, the AMF node 139 may manage terminal handover of the terminal device 40. In addition, the AMF node 139 manages location information of the terminal device 40.

The SMF node 136 has functions such as session management and IP allocation and management of the UE 40. A main role of the SMF node 136 is to establish or release a PDU session for the terminal device 40 so as to manage the PDU session. In addition, the SMF node 136 assigns an IP address to the terminal device 40.

The UDM node 137 has functions of generating 3GPP AKA authentication information and user ID processing. The AF node 10 has a function of providing a service in interaction with the core network.

The UDM node 137, the AMF node 139, and the SMF node 136 are critical NF nodes of the Control Plane.

The AUSF node 131 has an authentication function. The NSSF node 134 has a function related to selection of a network slice. The NEF node 132 has a function of providing a capability and an event of a network function to a third party, the AF node 10, or an edge computing function.

The NRF node 133 has a function of discovering network functions and maintaining network function profiles. The PCF node 135 has a function of policy control.

Each Control Plan Function of the control plane function group 130 is a data server, and acquires information from the UDM node 137 that stores subscriber information of the terminal device 40, thereby acquiring information regarding the terminal device (UE) 40.

The UDM node 137, the AMF node 139, and the SMF node 136, which are NF nodes of the Control Plan, are configured to be able to mutually exchange information held in each node via the API. In addition, the UDM node 137, the AMF node 139, and the SMF node 136 are configured to be able to control operations of each other via the API. Details of such an NF node are described in TS23.501 and TS23.502, for example.

In addition, the 5GC/NGC 120 is provided with an interface of transmitting information and controlling functions via an Application Programming Interface (API) referred to as a Service Based Interface. The API enables designation of a resource, and operations on the resource, such as GET (resource acquisition), POST (creation of resource and addition of data), PUT (create resource, update resource), and DELETE (resource deletion). The functions of the API are functions generally used in a Web service or the like, for example. Defining the interface with the API in this manner and disclosing the interface will facilitate addition of NF nodes, and enable the AF node 10 to change the operation of the Application by checking network information.

In addition, the 5GC/NGC 120 is provided with the NEF node 132. The NEF node 132 is used when the AF node 10 acquires information from each NF node. Specifically, the AF node 10 acquires information from each NF node via the NEF node 132. As defined in the standard, it is possible, in the local cellular network, to flexibly modify the core network. Therefore, it is considered that the AF node 10 can be modified to directly obtain information from the NF node or control the NF node without passing through the NEF node 132. In this manner, the AF node 10 that interacts with each NF node without passing through the NEF node 132 may be regarded as a new NF node different from the conventional AF node. Accordingly, the AF node 10 of the present disclosure may be defined as an NF node.

<3.3. Configuration Example of AF Node>

Figure 8:
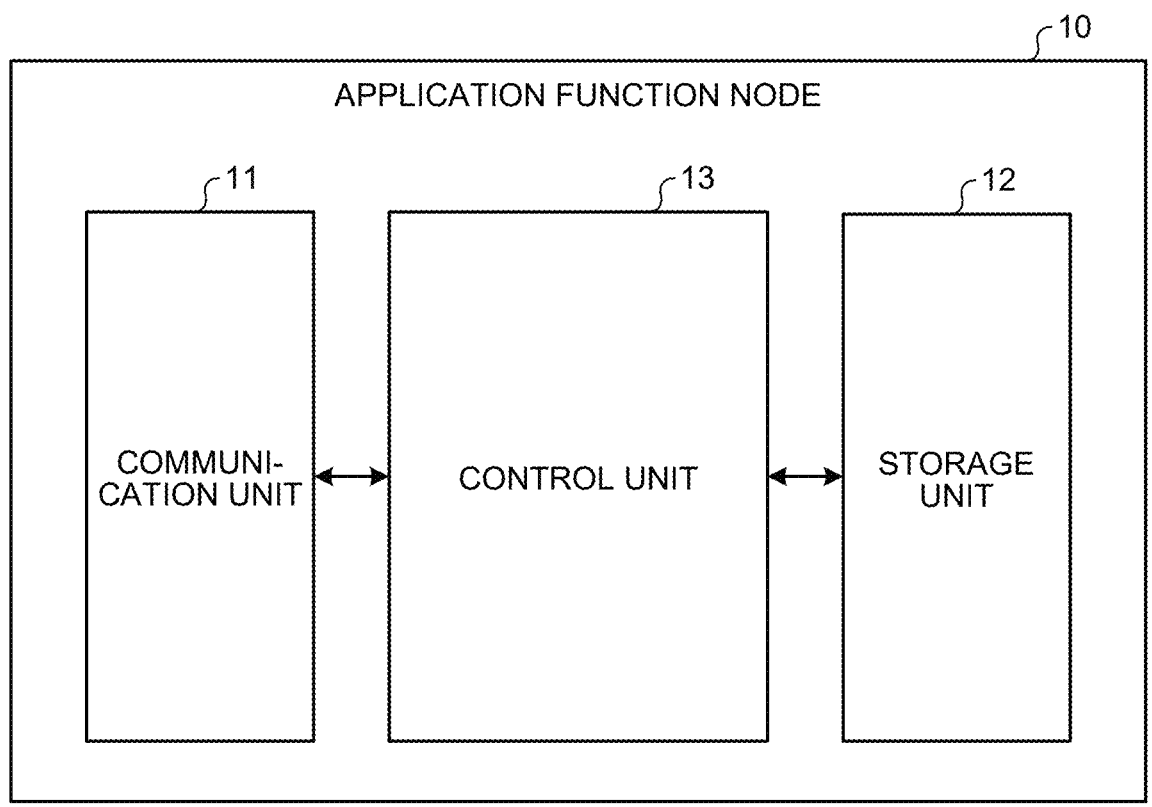
FIG. 8 is a block diagram illustrating a configuration example of an AF node according to the embodiment of the present disclosure.

Next, a configuration example of the AF node 10 will be described as an example of a configuration of each node of the 5GC/NGC 120 according to the embodiment of the present disclosure. FIG. 8 is a block diagram illustrating a configuration example of the AF node 10 according to the embodiment of the present disclosure.

The AF node 10 is an information processing device including a server device, for example, and includes a communication unit 11, a storage unit 12, and a control unit 13. Note that the configuration illustrated in FIG. 8 is a functional configuration, and the hardware configuration may be different from this. Furthermore, the functions of the AF node 10 may be implemented in a distributed manner in a plurality of physically separated configurations. For example, the AF node 10 may be constituted with a plurality of server devices. Furthermore, the functions of the AF node 10 may be implemented in a distributed manner in a plurality of physically and dynamically separated configurations.

The communication unit 11 is a communication interface for communicating with other devices. The communication unit 11 may be a network interface, or may be a device connection interface. The communication unit 11 has a function of directly or indirectly connecting to an Internet line. For example, the communication unit 11 may include a local area network (LAN) interface such as a network interface card (NIC), or may include a universal serial bus (USB) interface including a USB host controller, a USB port, and the like. Furthermore, the communication unit 11 may be a wired interface, or may be a wireless interface. The communication unit 11 functions as a communication means of the AF node 10. The communication unit 11 communicates with other nodes of the 5GC/NGC 120 under the control of the control unit 13.

The storage unit 12 is a data readable/writable storage device such as dynamic random access memory (DRAM), static random access memory (SRAM), a flash drive, or a hard disk. The storage unit 12 functions as a storage means of the AF node 10.

The control unit 13 is a controller that controls individual components of the AF node 10. The control unit 13 is implemented by a processor such as a central processing unit (CPU) or a micro processing unit (MPU), for example. For example, the control unit 13 is actualized by execution of various programs stored in the storage device inside the AF node 10 by the processor using random access memory (RAM) or the like as a work area. Note that the control unit 13 may be implemented by an integrated circuit such as an application specific integrated circuit (ASIC) or a field programmable gate array (FPGA). The CPU, MPU, ASIC, and FPGA can all be regarded as controllers.

The control unit 13 interacts with the core network to provide a service. In addition, the control unit 13 executes interference control processing to be described below.

Here, the configuration example of the AF node 10 has been described as an example of the configuration of each node of the 5GC/NGC 120. However, other nodes can also be implemented with the configuration similar to the AF node 10. In this case, the control unit 13 executes processing according to the function of each node.

<3.4. Configuration Example of Base Station Device>

The base station device 20 is a radio communication device that operates a cell and performs radio communication with the UE 40. The base station device 20 is a type of communication device. The base station device 20 may be provided in plurality and be connected to each other. One or the plurality of base station devices 20 may be included in a radio access network (RAN). That is, the base station device 20 may be simply referred to as a RAN, a RAN node, an Access Network (AN), or an AN node. When a CN as a connection target is an EPC, a corresponding RAN is referred to as an Enhanced Universal Terrestrial RAN (EUTRAN). When a CN as a connection target is a 5GC, a corresponding RAN is referred to as an NGRAN. The RAN in W-CDMA (UMTS) is referred to as UTRAN. The base station in LTE is referred to as Evolved Node B (eNodeB) or eNB. That is, EUTRAN includes one or a plurality of eNodeBs (eNBs). A NR base station is referred to as gNodeB or gNB. That is, NGRAN contains one or a plurality of gNBs. In addition, EUTRAN may include gNB (en-gNB) connected to the core network (EPC) in LTE communication systems (EPS). Similarly, NGRAN may include an ng-eNB connected to the core network 5GC in a 5G communication system (5GS). Additionally or alternatively, when the base station device 20 is an eNB, a gNB, or the like, the connection may be referred to as 3GPP Access. Additionally or alternatively, when the base station device 20 is a radio access point, the connection may be referred to as non-3GPP access. Additionally or alternatively, the base station device 20 may be an optical link device referred to as a Remote Radio Head (RRH) or a Remote Radio Unit (RRU). Additionally or alternatively, when the base station is gNB, the base station device 20 may be referred to as any of or a combination of gNB Central Unit (CU) and gNB Distributed Unit (DU). The gNB Central Unit (CU) hosts a plurality of upper layers (for example, RRC, SDAP, and PDCP) of the Access Stratum for communication with the UE 40. On the other hand, the gNB-DU hosts a plurality of lower layers (for example, RLC, MAC, and PHY) of the Access Stratum. That is, beam information (interfering beam information and desired beam information) to be described below may be generated by the gNB CU, the gNB-DU, or a combination of these. These pieces of information may be transmitted and received through an F1 interface. The base station device 20 may be configured to be able to communicate with another base station device 20. For example, when a plurality of base station devices 20 is eNB each or a combination of eNBs and en-gNBs, the base station devices 20 may be connected by an X2 interface. Additionally or alternatively, when a plurality of base stations are gNBs or a combination of a gn-eNB and a gNB, the devices may be connected by an Xn interface. Additionally or alternatively, when the plurality of base station devices 20 is a combination of a gNB central unit (CU) and a gNB distributed unit (DU), the devices may be connected by the above-described F1 interface. The message/information described below may be transferred in communication between a plurality of base stations (for example, via X2, Xn, or F1 interface). In addition, the base station device 20 may be an Integrated Access and Backhaul (IAB) donor node or an IAB relay node that provides a radio access channel and a radio backhaul channel by using time division multiplexing, frequency division multiplexing, or space division multiplexing.

A cell provided by the base station device 20 is referred to as a serving cell. The serving cell includes a primary cell (PCell) and a secondary cell (SCell). In a case where the dual connectivity (for example, EUTRA-EUTRA Dual Connectivity, EUTRA-NR Dual Connectivity (ENDC), EUTRA-NR Dual Connectivity with 5GC, NR-EUTRA Dual Connectivity (NEDC), or NR-NR Dual Connectivity) is provided to the UE 40, the PCell and 0 or one or more SCell(s) provided by a Master Node (MN) are referred to as a Master Cell Group. Furthermore, the serving cell may include a Primary Secondary Cell or Primary SCG Cell (PSCell). That is, in a case where dual connectivity is provided to the UE 40, the PSCell and the SCell(s), which is zero, or one or more, provided by a secondary node (SN) are referred to as Secondary Cell Group (SCG). Unless specially configured (for example, PUCCH on SCell), a physical uplink control channel (PUCCH) is transmitted in the PCell and the PSCell, but is not transmitted in the SCell. In addition, a radio link failure is also detected in the PCell and the PSCell, but is not detected in the SCell (need not be detected). In this manner, since the PCell and the PSCell have a special role in the Serving Cell(s), these cells are also referred to as Special Cells (SpCells). One cell may be associated with one downlink component carrier and one uplink component carrier. In addition, the system bandwidth corresponding to one cell may be divided into a plurality of bandwidth parts. In this case, one or a plurality of bandwidth parts may be configured for the UE, and one bandwidth part may be used for the UE 40 as an Active BWP. In addition, radio resources (for example, a frequency band, a numerology (subcarrier spacing), and a slot format (slot configuration)) usable by the terminal device (UE) 40 may be different for each cell, each component carrier, or each BWP. The beam described above can be uniquely identified within one cell or one BWP.

The base station device 20 may be capable of communicating with each other via a base station device-core network interface (for example, S1 Interface, NG Interface, or the like). This interface may be implemented as wired or wireless interface.

The base station device 20 can be utilized, operated, and/or managed by various entities (subjects). Assumable examples of the entity include: a mobile network operator (MNO), a mobile virtual network operator (MVNO), a mobile virtual network enabler (MVNE), a neutral host network (NHN) operator, an enterprise, an educational institution (incorporated educational institutions, boards of education of local governments, and the like), a real estate (building, apartment, and the like) administrator, an individual, or the like.

Note that the subject of use, operation, and/or management of the base station device 20 is not limited thereto. The base station device 20 may be installed and/or operated by one business operator, or may be installed and/or operated by one individual. Needless to say, the installation/operation subject of the base station device 20 is not limited thereto. For example, the base station device 20 may be installed and operated by a plurality of business operators or a plurality of individuals in cooperation. Furthermore, the base station device 20 may be a shared facility used by a plurality of business operators or a plurality of individuals. In this case, installation and/or operation of the facility may be performed by a third party different from the user.

The concept of the base station device (also referred to as a base station) includes not only a donor base station but also a relay base station (also referred to as a relay station or a relay station device). Furthermore, a base station conceptually includes not only a structure having a function of a base station but also a device installed in the structure.

The structure is, for example, a building such as a high-rise building, a house, a steel tower, a station facility, an airport facility, a port facility, or a stadium. The concept of the structure includes not only buildings but also non-building structures such as tunnels, bridges, dams, fences, and steel columns, as well as facilities such as cranes, gates, and windmills. In addition, the concept of the structure includes not only land-based (ground-based, in a narrow sense) structures or underground structures but also structures on the water, such as a jetty and a mega-float, and underwater structures such as an ocean observation facility. The base station device can be rephrased as a processing device or an information processing device.

The base station device 20 may be a donor station or a relay station. The base station device 20 may be a fixed station or a mobile station. The mobile station is a radio communication device (for example, a base station device) configured to be movable. At this time, the base station device 20 may be a device installed on a mobile body, or may be the mobile body itself. For example, a relay station device having mobility can be regarded as the base station device 20 as a mobile station. In addition, a device designed to have mobility, such as a vehicle, a drone, or a smartphone, and having a function of a base station device (at least a part of the function of a base station device) also corresponds to the base station device 20 as a mobile station.

Here, the mobile body may be a mobile terminal such as a smartphone or a mobile phone. The mobile body may be a mobile body that moves on the land (ground in a narrow sense) (for example, a vehicle such as an automobile, a motorcycle, a bus, a truck, a motorbike, a train, or a linear motor car), or a mobile body (for example, subway) that moves under the ground (for example, through a tunnel).

The mobile body may be a mobile body that moves on the water (for example, a ship such as a passenger ship, a cargo ship, and a hovercraft), or a mobile body that moves underwater (for example, a submersible ship such as a submersible boat, a submarine, or an unmanned submarine).

Furthermore, the mobile body may be a mobile body that moves in the atmosphere (for example, an aircraft such as an airplane, an airship, or a drone), or may be a mobile body that moves outside the atmosphere (for example, an artificial astronomical object such as an artificial satellite, a spaceship, a space station, or a spacecraft). A mobile body moving outside the atmosphere can be rephrased as a space mobile body.

Furthermore, the base station device 20 may be a terrestrial base station device (ground station device) installed on the ground. For example, the base station device 20 may be a base station device arranged in a structure on the ground, or may be a base station device installed in a mobile body moving on the ground. More specifically, the base station device 20 may be an antenna installed in a structure such as a building and a signal processing device connected to the antenna. Note that the base station device 20 may be a structure or a mobile body itself. The "ground" represents not only a land (ground in a narrow sense) but also a ground or terrestrial in a broad sense including underground, above-water, and underwater. Note that the base station device 20 is not limited to the terrestrial base station device. The base station device 20 may be a non-terrestrial base station device (non-ground station device) capable of floating in the air or space. For example, the base station device 20 may be an aircraft station device or a satellite station device.

The aircraft station device is a radio communication device capable of floating in the atmosphere, such as an aircraft. The aircraft station device may be a device mounted on an aircraft or the like, or may be an aircraft itself. The concept of the aircraft includes not only heavy aircraft such as an airplane and a glider but also light aircraft such as a balloon and an airship. In addition, the concept of an aircraft includes not only a heavy aircraft and a light aircraft but also a rotorcraft such as a helicopter and an auto-gyro. Note that the aircraft station device (or an aircraft on which an aircraft station device is mounted) may be an unmanned aerial vehicle such as a drone.

Note that the concept of the unmanned aerial vehicle also includes an unmanned aircraft system (UAS) and a tethered UAS. The concept of unmanned aerial vehicles also includes a Lighter-than-Air (LTA) unmanned aircraft system (UAS) and a Heavier-than-Air (HTA) unmanned aircraft system (UAS). Other concepts of unmanned aerial vehicles also include High Altitude Platforms (HAPs) unmanned aircraft system (UAS).

The satellite station device is a radio communication device capable of floating outside the atmosphere. The satellite station device may be a device mounted on a space mobile body such as an artificial satellite, or may be a space mobile body itself. The satellite serving as the satellite station device may be any of a low earth orbiting (LEO) satellite, a medium earth orbiting (MEO) satellite, a geostationary earth orbiting (GEO) satellite, or a highly elliptical orbiting (HEO) satellite. Accordingly, the satellite station device may be a device mounted on a low earth orbiting satellite, a medium earth orbiting satellite, a geostationary earth orbiting satellite, or a highly elliptical orbiting satellite.

The coverage (for example, the cell) of the base station device 20 may be large such as a macro cell or small such as a pico cell. Needless to say, the coverage of the base station device 20 may be extremely small such as a femto cell. Furthermore, the base station device 20 may have a beamforming capability. In this case, the base station device 20 may form a cell or a service area for each beam.

In another aspect, the base station device 20 may include a set of a plurality of physical or logical devices as follows. For example, in the embodiment of the present disclosure, the base station device 20 may be classified into a plurality of devices of Baseband Unit (BBU) and Radio Unit (RU), and may be interpreted as an aggregate of these plurality of devices. Additionally or alternatively, in the embodiment of the present disclosure, the base station device 20 may be either or both of BBU and RU. The BBU and the RU may be connected by a predetermined interface (for example, eCPRI). Additionally or alternatively, RU may be referred to as Remote Radio Unit (RRU) or Radio DoT (RD). Additionally or alternatively, the RU may correspond to the gNB-DU described above. Additionally or alternatively, the BBU may correspond to the gNB-CU described above. Additionally or alternatively, the RU may be a device integrally formed with the antenna. An antenna (for example, an antenna integrally formed with an RU) included in the base station device 20 may adopt an Advanced Antenna System and support MIMO (for example, FD-MIMO) or beamforming. In the Advanced Antenna System, an antenna (for example, an antenna integrally formed with an RU) included in the base station device 20 may include 64 transmission antenna ports and 64 reception antenna ports, for example.

Figure 9:
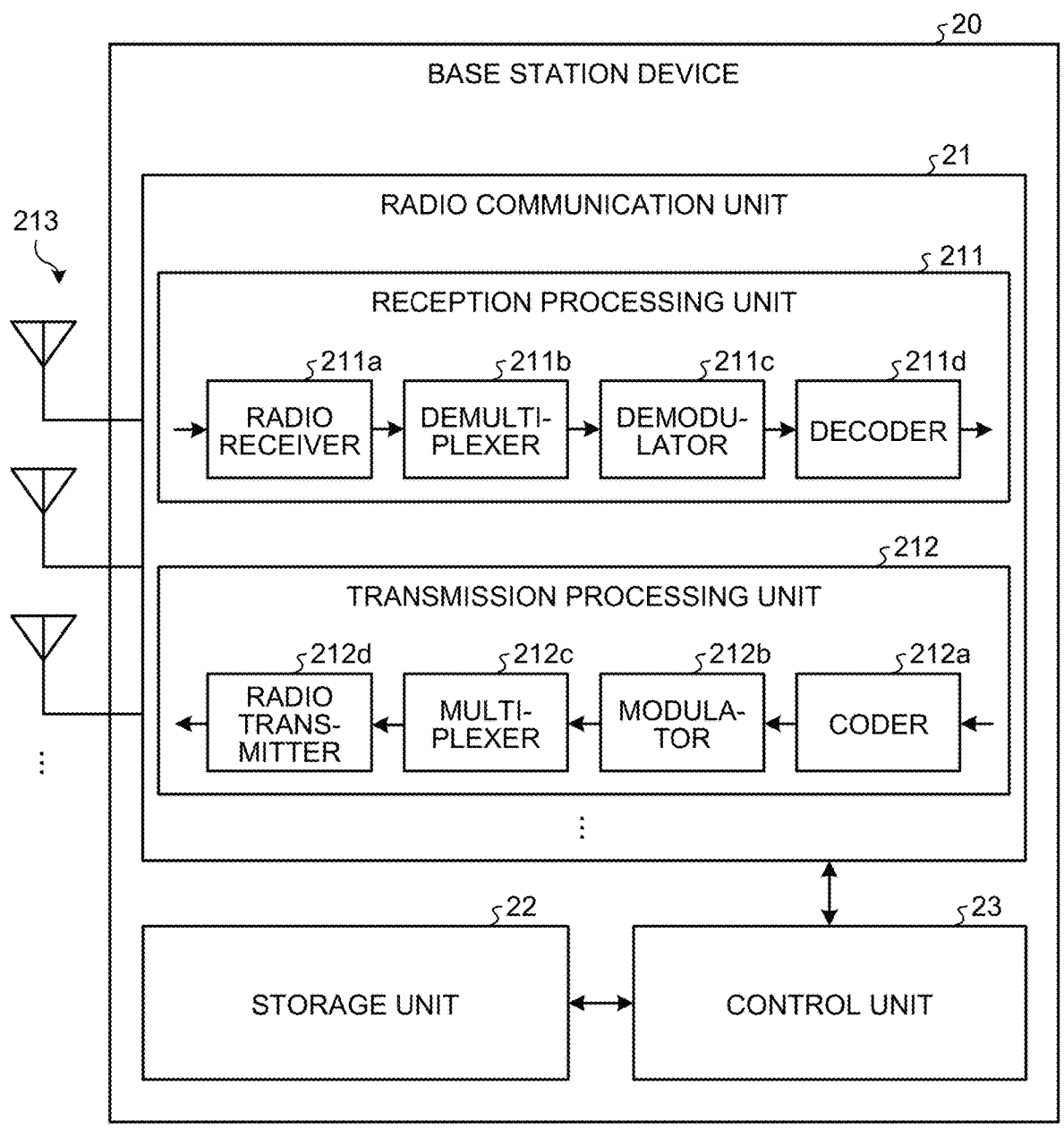
FIG. 9 is a diagram illustrating a configuration example of a base station device according to the embodiment of the present disclosure.

Here, a configuration example of the base station device 20 will be described with reference to FIG. 9. FIG. 9 is a diagram illustrating a configuration example of the base station device 20 according to the embodiment of the present disclosure. The base station device 20 includes a signal processing unit 21, a storage unit 22, and a control unit 23. Note that the configuration illustrated in FIG. 9 is a functional configuration, and the hardware configuration may be different from this. Furthermore, the functions of the base station device 20 may be implemented in a distributed manner in a plurality of physically separated devices.

The signal processing unit 21 is a signal processing unit for performing radio communication with other radio communication devices (for example, the terminal device 40). The signal processing unit 21 operates under the control of the control unit 23. The signal processing unit 21 supports one or a plurality of radio access methods. For example, the signal processing unit 21 supports both NR and LTE. The signal processing unit 21 may support W-CDMA and cdma2000 in addition to NR and LTE.

The signal processing unit 21 includes a reception processing unit 211, a transmission processing unit 212, and an antenna 213. The signal processing unit 21 may include a plurality of the reception processing units 211, a plurality of the transmission processing units 212, and a plurality of the antennas 213. In a case where the signal processing unit 21 supports a plurality of radio access methods, individual portions of the signal processing unit 21 can be configured separately for each of the radio access methods. For example, the reception processing unit 211 and the transmission processing unit 212 may be individually configured for LTE and NR.

The reception processing unit 211 processes an uplink signal received via the antenna 213. The reception processing unit 211 includes a radio receiver 211*a*, a demultiplexer 211*b*, a demodulator 211*c*, and a decoder 211*d*.

For example, the radio receiver 211*a* performs processing on the uplink signal, such as down-conversion, removal of unnecessary frequency components, amplification level control, orthogonal demodulation, conversion to digital signal, removal of guard interval (cyclic prefix), and frequency domain signal extraction using fast Fourier transform. The demultiplexer 211*b* demultiplexes an uplink channel such as a physical uplink shared channel (PUSCH) or a physical uplink control channel (PUCCH) and an uplink reference signal from the signal output from the radio receiver 211*a*. Using a modulation scheme such as binary phase shift keying (BPSK) or quadrature phase shift keying (QPSK) for the modulation symbol of the uplink channel, the demodulator 211*c* demodulates the received signal. The modulation scheme used by the demodulator 211*c* may be 16 quadrature amplitude modulation (QAM), 64 QAM, or 256 QAM. In this case, the signal points on the constellation do not necessarily have to be equidistant. The constellation may be a non-uniform constellation (NUC). The decoder 211*d* performs decoding processing on the demodulated coded bits of the uplink channel. The decoded uplink data and uplink control information are output to the control unit 23.

The transmission processing unit 212 performs transmission processing of downlink control information and downlink data. The transmission processing unit 212 includes a coder 212*a*, a modulator 212*b*, a multiplexer 212*c*, and a radio transmitter 212*d*.

The coder 212*a* encodes the downlink control information and the downlink data input from the control unit 23 by using a coding method such as block coding, convolutional coding, or turbo coding. The modulator 212*b* modulates the coded bits output from the coder 212*a* by a predetermined modulation scheme such as BPSK, QPSK, 16 QAM, 64 QAM, or 256 QAM. In this case, the signal points on the constellation do not necessarily have to be equidistant. The constellation may be a non-uniform constellation. The multiplexer 212*c* multiplexes the modulation symbol of each of channels and the downlink reference signal and allocates the multiplexed signals on a predetermined resource element. The radio transmitter 212*d* performs various types of signal processing on the signal from the multiplexer 212*c*. For example, the radio transmitter 212*d* performs processing such as conversion to the time domain using fast Fourier transform, addition of a guard interval (cyclic prefix), generation of a baseband digital signal, conversion to an analog signal, quadrature modulation, upconvert, removal of extra frequency components, and power amplification. The signal generated by the transmission processing unit 212 is transmitted from the antenna 213.

The storage unit 22 is a data readable/writable storage device such as DRAM, SRAM, a flash drive, and a hard disk. The storage unit 22 functions as a storage means in the base station device 20.

The control unit 23 is a controller that controls individual components of the base station device 20. The control unit 23 is implemented by a processor such as a central processing unit (CPU) or a micro processing unit (MPU), for example. For example, the control unit 23 is implemented by execution of various programs stored in the storage device inside the base station device 20 by the processor using random access memory (RAM) or the like as a work area. Note that the control unit 23 may be implemented by an integrated circuit such as an application specific integrated circuit (ASIC) or a field programmable gate array (FPGA). The CPU, MPU, ASIC, and FPGA can all be regarded as controllers.

The control unit 23 executes the above-described beam sweeping process with the terminal device 40. Furthermore, the control unit 23 transmits beam information to the AF node 10 according to the result of the beam sweeping process. Details of the operation of the control unit 23 will be described below.

<3.5. Configuration Example of Terminal Device>

The terminal device 40 is a radio communication device that performs radio communication with the base station device 20. Examples of the terminal device 40 include a mobile phone, a smart device (smartphone or tablet), a personal digital assistant (PDA), or a personal computer. Furthermore, the terminal device 40 may be a device such as a business camera equipped with a communication function, or may be a motorcycle, a moving relay vehicle, or the like on which communication equipment such as a field pickup unit (FPU) is mounted. The terminal device 40 may be a machine to machine (M2M) device or an Internet of Things (IoT) device.

Furthermore, the terminal device 40 may be capable of sidelink communication with another terminal device 40. The terminal device 40 may be capable of using an automatic retransmission technology such as HARQ when performing sidelink communication. Furthermore, the terminal device 40 may be capable of LPWA communication with other communication devices (for example, the base station device 20 or another terminal device 40). In addition, the radio communication used by the terminal device 40 may be radio communication using millimeter waves. The radio communication (including sidelink communication) used by the terminal device 40 may be radio communication using radio waves or wireless communication (optical wireless communication) using infrared rays or visible light.

Furthermore, the terminal device 40 may be a mobile device. Here, the mobile device is a movable radio communication device. At this time, the terminal device 40 may be a radio communication device installed on a mobile body, or may be the mobile body itself. For example, the terminal device 40 may be a vehicle that moves on a road, such as an automobile, a bus, a truck, or a motorbike, or may be a radio communication device mounted on the vehicle. The mobile body may be a mobile terminal, or may be a mobile body that moves on land (on the ground in a narrow sense), in the ground, on water, or under water. Furthermore, the mobile body may be a mobile body that moves inside the atmosphere, such as a drone or a helicopter, or may be a mobile body that moves outside the atmosphere, such as an artificial satellite.

The terminal device 40 does not necessarily have to be a device directly used by a person. The terminal device 40 may be a sensor installed in a machine or the like in a factory, such as a sensor used for communication referred to as machine type communication (MTC). The terminal device 40 may be a machine to machine (M2M) device or an Internet of Things (IoT) device. Furthermore, the terminal device 40 may be a device having a relay communication function as represented by Device to Device (D2D) and Vehicle to everything (V2X). Furthermore, the terminal device 40 may be a device referred to as Client Premises Equipment (CPE) used in a radio backhaul or the like.

Figure 10:
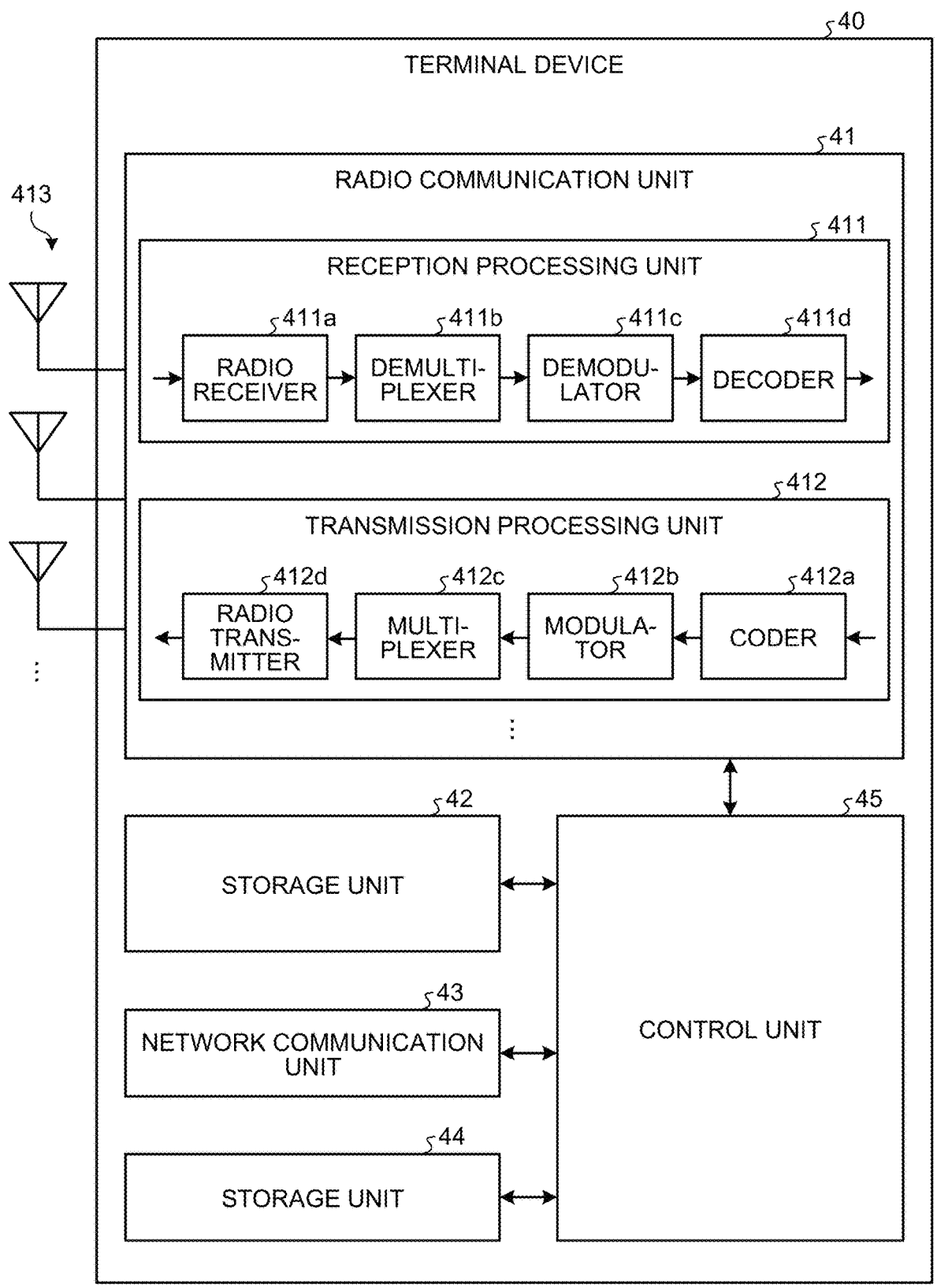
FIG. 10 is a diagram illustrating a configuration example of a terminal device according to an embodiment of the present disclosure.

A configuration example of the terminal device 40 will described with reference to FIG. 10. FIG. 10 is a diagram illustrating a configuration example of the terminal device 40 according to the embodiment of the present disclosure. The terminal device 40 includes a signal processing unit 41, a storage unit 42, a network communication unit 43, an input/output unit 44, and a control unit 45. Note that the configuration illustrated in FIG. 10 is a functional configuration, and the hardware configuration may be different from this. Furthermore, the functions of the terminal device 40 may be implemented in a distributed manner in a plurality of physically separated configurations.

The signal processing unit 41 is a signal processing unit for radio communication with other radio communication devices (for example, the base station device 20 and a relay device 30). The signal processing unit 41 operates under the control of the control unit 45. The signal processing unit 41 supports one or a plurality of radio access methods. For example, the signal processing unit 41 supports both NR and LTE. The signal processing unit 41 may support W-CDMA and cdma2000 in addition to NR and LTE.

The signal processing unit 41 includes a reception processing unit 411, a transmission processing unit 412, and an antenna 413. The signal processing unit 41 may include a plurality of the reception processing units 411, a plurality of the transmission processing units 412, and a plurality of the antennas 413. In a case where the signal processing unit 41 supports a plurality of radio access methods, individual portions of the signal processing unit 41 can be configured separately for each of the radio access methods. For example, the reception processing unit 411 and the transmission processing unit 412 may be individually configured for LTE and NR.

The reception processing unit 411 processes a downlink signal received via the antenna 413. The reception processing unit 411 includes a radio receiver 411a, a demultiplexer 411b, a demodulator 411c, and a decoder 411d.

For example, the radio receiver 411a performs processing on the downlink signal, such as down-conversion, removal of unnecessary frequency components, amplification level control, orthogonal demodulation, conversion to digital signal, removal of guard interval (cyclic prefix), and frequency domain signal extraction using fast Fourier transform. The demultiplexer 411b demultiplexes a downlink channel, a downlink synchronization signal, and a downlink reference signal from the signal output from the radio receiver 411a. Examples of the downlink channel include a channel such as a physical broadcast channel (PBCH), a physical downlink shared channel (PDSCH), or a physical downlink control channel (PDCCH). The demodulator 211c demodulates the received signal using a modulation scheme such as BPSK, QPSK, 16 QAM, 64 QAM, or 256 QAM onto the modulation symbol of the downlink channel. In this case, the signal points on the constellation do not necessarily have to be equidistant. The constellation may be a non-uniform constellation. The decoder 411d performs decoding processing on the demodulated coded bits of the downlink channel. The decoded downlink data and uplink control information are output to the control unit 45.

The transmission processing unit 412 performs transmission processing of uplink control information and uplink data. The transmission processing unit 412 includes a coder 412a, a modulator 412b, a multiplexer 412c, and a radio transmitter 412d.

The coder 412a encodes the uplink control information and the uplink data input from the control unit 45 by using a coding method such as block coding, convolutional coding, or turbo coding. The modulator 412b modulates the coded bits output from the coder 412a by a predetermined modulation scheme such as BPSK, QPSK, 16 QAM, 64 QAM, or 256 QAM. In this case, the signal points on the constellation do not necessarily have to be equidistant. The constellation may be a non-uniform constellation. The multiplexer 412c multiplexes the modulation symbol of each of channels and an uplink reference signal, and allocates the multiplexed signals on a predetermined resource element. The radio transmitter 412d performs various types of signal processing on the signal from the multiplexer 412c. For example, the radio transmitter 412d performs processing such as conversion to the time domain using inverse fast Fourier transform, addition of a guard interval (cyclic prefix), generation of a baseband digital signal, conversion to an analog signal, quadrature modulation, upconvert, removal of extra frequency components, and power amplification. The signal generated by the transmission processing unit 412 is transmitted from the antenna 413.

The storage unit 42 is a data readable/writable storage device such as DRAM, SRAM, a flash drive, and a hard disk. The storage unit 42 functions as a storage means in the terminal device 40.

The network communication unit 43 is a communication interface for communicating with other devices. For example, the network communication unit 43 is a LAN interface such as an NIC. Furthermore, the network communication unit 43 may be a wired interface, or may be a wireless interface. The network communication unit 43 functions as a network communication means of the terminal device 40. The network communication unit 43 communicates with other devices under the control of the control unit 45.

The input/output unit 44 is a user interface for exchanging information with the user. For example, the input/output unit 44 is an operation device such as a keyboard, a mouse, operation keys, and a touch panel, used by a user to perform various operations. Alternatively, the input/output unit 44 is a display device such as a liquid crystal display, or an organic electroluminescence (EL) display. The input/output unit 44 may be an acoustic device such as a speaker or a buzzer. Furthermore, the input/output unit 44 may be a lighting device such as a light emitting diode (LED) lamp. The input/output unit 44 functions as an input/output means (input means, output means, operation means, or notification means) provided on the terminal device 40.

The control unit 45 is a controller that controls individual parts of the terminal device 40. The control unit 45 is actualized by a processor such as a CPU or an MPU, for example. For example, the control unit 45 is implemented by a processor executing various programs stored in a storage device inside the terminal device 40 using RAM or the like as a work area. Note that the control unit 45 may be implemented by an integrated circuit such as an ASIC or an FPGA. The CPU, MPU, ASIC, and FPGA can all be regarded as controllers.

<<4. Technical Features>>

<4.1. Output of Beam Information by Base Station Device>

As described above, in a case where there are different vendors of the base station devices 20 or there are different PLMNs (communication operators), there has been difficulty in suppressing inter-beam interference by the base station device 20. It may well be assumed that there are different PLMN networks in a local area, such as indoors or on factory premises, for example. Therefore, there is a demand for a means, even in such a case, of suppressing inter-beam interference.

Therefore, in the present embodiment, information regarding the PDU session and the beam is to be output efficiently from the base station device 20 so as to enable the AF node 10 to perform beam interference control.

More specifically, in the present embodiment, the base station device 20 discloses the information related to the beam paired with the information for identifying the PDU session by an API, for example. Since the base station device 20 discloses such information by the API, there is an advantageous effect of making it easier for another base station device 20 or an NF node to acquire information even with different vendors or PLMNs of the base station device 20. In addition, there is an advantageous effect of making it easier for the AF node 10 using such information to acquire such information even when the information is not standardized.

Figures 11, 12:
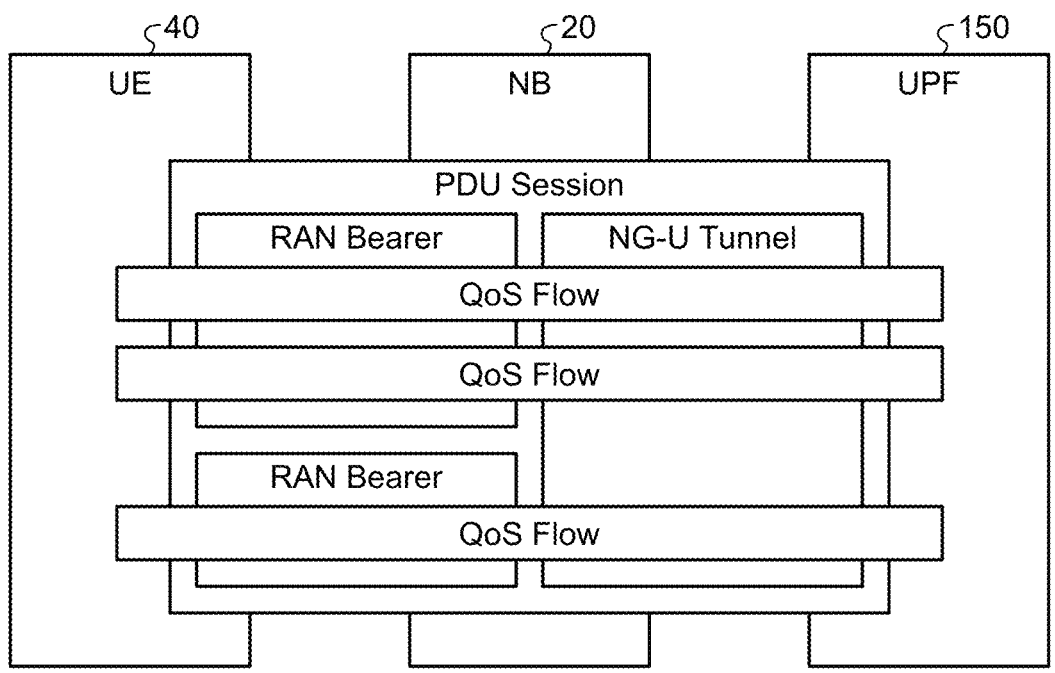
FIG. 11 is a diagram illustrating a PDU session.
FIG. 12 is a diagram illustrating an example of beam group information disclosed by the base station device according to the embodiment of the present disclosure using an API.

Here, a PDU session will be described with reference to FIG. 11. FIG. 11 is a diagram illustrating a PDU session.

As illustrated in FIG. 11, the PDU session is established among the terminal device 40 (described as UE in FIG. 11), the base station device 20 (described as NB in FIG. 11), and the UPF node 150. After the PDU session is established, the terminal device 40 can communicate with the base station device 20 and the core network. One PDU session is allocated to one terminal device 40. One PDU session includes a plurality of QoS flows (QoS Flows). One QoS flow includes a plurality of IP packets. The QoS of a plurality of IP packets included in one QoS flow is all the same.

When the QoS is the same, the flows will be handles as the same QoS flow in the PDU session even when one terminal device 40 communicates with a plurality of servers (an example of an NF node).

In this manner, a PDU session can be associated with information regarding whether communication is critical (for example, QoS). Therefore, the base station device 20 outputs the PDU session information and the beam information in association with each other, making it possible or the AF node 10 that has acquired such information to determine which PDU session is critical and which beam should be protected against interference.

In the PDU session, a tunnel made of a GTP tunneling protocol referred to as NG-U Tunnel is provided (mapped) between the base station device 20 and the UPF node 150 for the terminal device 40. This tunnel is used for connection between the terminal device 40 and the UPF node 150. As illustrated in FIG. 11, one NG-U Tunnel is provided for one PDU session, and thus, a PDU session number (PDU Session ID) and an NG-U Tunnel ID are mapped on a one-to-one basis.

In addition, the PDU session includes a RAN bearer (for example, SRB or DRB) provided (mapped) between the terminal device 40 and the base station device 20. As illustrated in FIG. 11, one or a plurality of RAN Bearers are provided (mapped) in one PDU session.

The RAN Bearer is not necessarily provided in one beam. The base station device 20 may use (associate) a plurality of beams in one RAN Bearer. In addition, the base station device 20 may frequently perform fine adjustment within a plurality of beams having close characteristics. The beam associated with the PDU session is not limited to one but may be in plurality. Similarly, one or a plurality of beams are associated with the NG-U Tunnel.

In this manner, the PDU session is a session for one terminal device 40, but such a PDU session is not necessarily provided in one beam. For example, a plurality of small base station devices (TRPs) may provide one PDU session on separate beams. Furthermore, the beam used by the base station device 20 can change frequently with the lapse of time.

Therefore, the base station device 20 according to the present embodiment outputs, as the beam group information, information regarding a plurality of beams highly likely to be used in the PDU session. This makes it possible for the base station device 20 to output the information regarding the beam constantly used in the PDU session.

Here, an example of beam group information disclosed by the base station device 20 using the API will be described with reference to FIG. 12. FIG. 12 is a diagram illustrating an example of beam group information disclosed by the base station device 20 according to the embodiment of the present disclosure using an API.

As illustrated in FIG. 12, beam group information is disclosed for each PDU session ID identifying a PDU session or for each NG-U Tunnel ID identifying an NG-U Tunnel. The beam group information includes numbers (beam IDs) identifying a plurality of beams used in the PDU session. The example illustrated in FIG. 12 discloses the probability that the base station device 20 uses the beam, together with the beam ID. However, the usage probability of the beam does not have to be disclosed, and the base station device 20 may disclose the beam ID.

In the example of FIG. 12, it is disclosed that, in the PDU session with the PDU session ID or the NG-U Tunnel ID of "i", "Beam 2" is used with a probability of "70%", "Beam 4" is used with a probability of "20%", and "Beam 15" is used with a probability of "10%". In this manner, the base station device 20 outputs the information (beam ID in this case) regarding the plurality of beams in association with the PDU session ID.

FIG. 13 is a diagram illustrating another example of beam group information disclosed by the base station device 20 according to the embodiment of the present disclosure using an API.

As illustrated in FIG. 13, the base station device 20 may represent the usage probability by replacing it with another index, for example, rather than outputting the usage probability of the beam as it is. The usage probability of a beam illustrated in FIG. 13 is obtained by classifying the usage probability illustrated in FIG. 12 into five levels and replacing them with numerical values, in which the usage probability of "Beam 2" is represented by "1", the usage probability of "Beam 4" is represented by "4", and the usage probability of "Beam 15" is represented by "5". Note that FIG. 13 illustrates that the smaller the numerical value, the higher the usage probability, indicating higher usability of the beam.

FIGS. 14 and 15 are diagrams illustrating other examples of beam group information disclosed by the base station device 20 according to the embodiment of the present disclosure using an API.

The PDU session is provided with the same ID from the point of establishment until being released, during the time of use of the session. Accordingly, the base station device 20 may output, as the probability of using the beam (usage probability), the probability of using the beam during a period from the start of the session until the base station device 20 outputs the beam group information.

FIG. 14 illustrates an example of beam group information in a case where the base station device 20 outputs the probability of using the beam after establishment of a PDU session with PDU session ID "i". FIG. 14 illustrates a beam and a probability of using the beam in a case where Y hours have elapsed from the establishment of the PDU session to the present.

In addition, the base station device 20 may output the beam usage probability in Z hours immediately before outputting the beam group information, for example. FIG. 15 illustrates an example in which the base station device 20 outputs the usage probability of the beam used in the latest Z hours in the PDU session with the PDU session ID "i". In this manner, the base station device 20 can output the beam usage probability in predetermined time periods.

Although the number of beams included in the beam group information is 3 in FIGS. 12 to 15, the number of beams is not limited thereto. The number of beams included in the beam group information may be two or less or four or more. The number of beams included in the beam group information may be designated by the AF node 10 that acquires the beam group information.

In addition to the number of beams, the AF node 10 may designate information included in the beam group information, such as a period for calculating the usage probability of a beam (Z hours described above) and a lower limit value of the usage probability. FIG. 16 is a diagram illustrating an example of configuration of beam group information set by the AF node 10 according to the embodiment of the present disclosure. Here, the AF node 10 performs configuration with the base station device 20 for the beam group information to be output in advance before requesting the output of group beam information, but the timing is not limited thereto. For example, the AF node 10 may designate the beam group information to be requested every time of requesting the output of the beam group information.

As illustrated in FIG. 16, the AF node 10 sets the base station device 20 to output group beam information including a maximum of 10 beams. Furthermore, the AF node 10 sets the base station device 20 to output a beam having a usage probability of 20% or more. The AF node 10 sets the base station device 20 to output the usage probability in last three hours before outputting the group beam information.

After performing preset regarding beam group information to be output to the base station device 20, the AF node 10 transmits a message requesting the base station device 20 to output information at a timing of acquiring the beam group information. The AF node 10 transmits the message, including information (for example, a PDU session ID or an NG-U Tunnel ID) for identifying the PDU session acquired, to the base station device 20.

Note that the information for identifying the PDU session included in the message by the AF node 10 is not limited to the PDU session ID or the NG-U Tunnel ID. For example, the AF node 10 may transmit a message including IP packet information in addition to the PDU session. For example, it is also conceivable that the AF node 10 acquires beam group information used by an IP packet by making an inquiry to the base station device 20 using a Source IP Address or a Destination IP Address of the IP packet. Note that it is considered to be a desirable method for the AF node 10 to inquire of the base station device 20 using the PDU session ID or the NG-U Tunnel ID.

Furthermore, 5G has a newly introduced concept referred to as a network slice. By introducing the network slice, the cellular network system can provide a plurality of isolated networks. A cellular network system can provide a plurality of networks having different properties as virtual networks by using the network slice.

The terminal device 40 can make a request as to which network slice to use when connecting to a cellular network. Since both the core network and the base station device 20 grasp the network slice, the core network and the base station device 20 can determine which network slice the terminal device 40 is using by S-NSSAI which is an identification ID of the network slice. Accordingly, there is also a method of requesting the base station device 20 to output group beam information including the identification number of the network slice referred to as S-NSSAI so as to receive from the base station device 20 a report of information regarding the beam using the network slice.

Figures 17, 18:
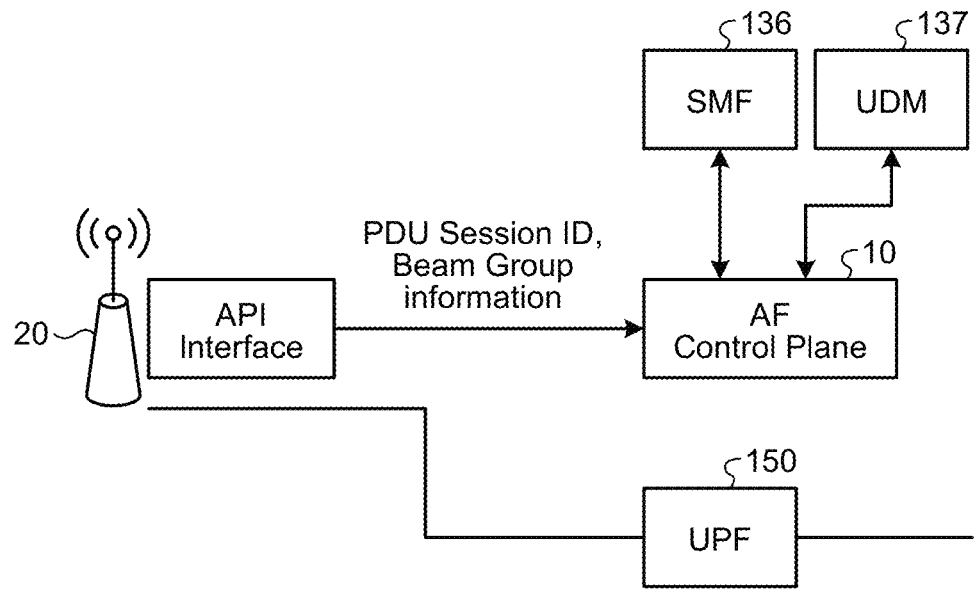
FIG. 17 is a diagram illustrating an inquiry to the base station device from the AF node according to the embodiment of the present disclosure.
FIG. 18 is a diagram illustrating a configuration example of a communication system according to the embodiment of the present disclosure.

Hereinafter, a method in which the AF node 10 inquires the base station device 20 about the group beam information will be described with reference to FIG. 17. FIG. 17 is a diagram illustrating an inquiry to the base station device 20 by the AF node 10 according to the embodiment of the present disclosure.

When the AF node 10 inquires the base station device 20 about the information regarding the beam using the API, the AF node 10 designates a Key and a Value using the API and makes an inquiry. For example, as illustrated in FIG. 17, when making an inquiry using the PDU session ID, the AF node 10 designates "PDU Session ID" as the Key and "1" as the Value by API.

In addition, the AF node 10 can designate a specific QoS flow included in the PDU session to obtain information regarding a beam used for the QoS flow. The term QFI illustrated in FIG. 17 represents QoS Flow Identity. The AF node 10 designates "PDU Session ID" and "QFI" as Key and designates "1" and "2" as Value by API, thereby requesting acquisition of the group beam information including the beam information used for the QoS flow of the designated PDU session. In this manner, it is possible to specify the PDU session of the terminal device 40 by designating "PDU Session ID" as Key, and possible to specify the QoS flow used by the terminal device 40 by designating "QFI".

In addition, the AF node 10 can designate 5-tuples of IP such as Destination IP Address/port and Source IP Address/port and designate a Value corresponding to the Key, as the Key and can make an inquiry to the base station device 20.

When the AF node 10 designates a PDU session ID and requests acquisition of the group beam information, for example, the base station device 20 outputs the group beam information illustrated in FIGS. 12 to 15 to the AF node 10 as a response to the request.

In this manner, the AF node 10 acquires the beam group information including the PDU session ID and the beam that is likely to be used in the PDU session identified by the PDU session ID. Note that although the AF node 10 is used herein, the AF node 10 may be an NF node. The AF node according to the present embodiment has substantially the same function as the NF node.

Here, a method of determining a PDU session with which the AF node 10 according to the present embodiment makes an inquiry to the base station device 20 will be described.

The PDU session with which the AF node 10 makes an inquiry to the base station device 20 may be obtained by the AF node 10 from the UDM node 137 by using, for example, subscriber identification information (for example, Subscriber Permanent Identifier (SUPI), Subscriber Concealed Identifier (SUCI), Globally Unique Temporary Identifier (GUTI), or Temporary Mobile Subscriber Identity (TMSI). According to a procedure defined in a standard, the AF node 10 can obtain the session ID of the PDU session used by the terminal device 40 corresponding to the subscriber identification information from the UDM node 137.

For example, there is a conceivable case where the AF node 10 has already acquired information regarding the terminal device 40 to be protected, including a case where a local area is in a factory and communication to be protected is communication with a device that should not cause a communication failure for a production line of the factory. In this case, the AF node 10 can use pre-registration or the like to acquire information regarding the critical terminal device 40 having a communication that should be protected, for example. The AF node 10 specifies subscriber identification information (for example, SUPI) of the terminal device 40 from the information regarding the terminal device 40, and acquires, from the UDM node 137, a session ID of a critical PDU session that should be protected, in communication, against interference by using the specified subscriber identification information.

Subsequently, in order to protect the critical PDU session against interference, the AF node 10 determines to release a PDU session that interferes with the PDU session and hinders communication (hereinafter, also referred to as an interfering PDU session). When having received a request to protect a critical PDU session, for example, the AF node 10 requests the SMF node 136 to release the interfering PDU session. The AF node 10 can be notified of the request to protect the PDU session, for example, at a predetermined cycle or at a timing of execution of a predetermined application.

Having received the notification to protect the critical PDU session, the AF node 10 acquires beam group information corresponding to the critical PDU session from the base station device 20. Here, the AF node 10 is assumed to have previously acquired interfering beam information regarding an interfering beam that interferes with a transmission beam from the base station device 20. The AF node 10 specifies an interfering beam that interferes with a beam included in the acquired beam group information. The AF node 10 specifies an interfering PDU session that uses the specified interfering beam. The interfering PDU session can be specified, for example, by execution, by the AF node 10, operations including specifying a PDU session other than the PDU session that is critical to the base station device 20 to obtain beam group information, and determining whether the obtained beam group information includes an interfering beam. The AF node 10 requests the SMF node 136 to release the specified interfering PDU session. This makes it possible to release a PDU session that interferes with a critical PDU session, leading to suppression of inter-beam interference that interferes with a critical PDU session.

Note that, when the AF node 10 requests the SMF node 136 to release the PDU session, the AF node 10 may designate the PDU session to be released using the PDU session ID as a Key, or using the SUPI as a Key.

Here, the AF node 10 requests to release the interfering PDU session, but the request is not limited thereto. For example, the AF node 10 may request the SMF node 136 to stop the interfering PDU session. This request stops communication in the interfering PDU session, making it possible to suppress inter-beam interference in which an interfering beam used in the interfering PDU session interferes a beam used in a critical PDU session.

In addition, although the AF node 10 requests to release or stop the interfering PDU session here, the object of release is not limited thereto. For example, the AF node 10 may request the SMF node 136 to release all PDU sessions except critical PDU sessions.

In addition, although the interfering PDU session released by the AF node 10 is specified here, the operation is not limited thereto. For example, the AF node 10 may notify the base station device 20 of information regarding the specified interfering beam. The base station device 20 stops using the notified interfering beam. Alternatively, the base station device 20 may request the SMF node 136 to release or stop the PDU session using the notified interfering beam.

Here, a configuration example of a communication system according to the embodiment of the present disclosure will be described with reference to FIG. 18. FIG. 18 is a diagram illustrating a configuration example of a communication system according to an embodiment of the present disclosure. Note that FIG. 18 illustrates an NF node related to the interference control processing of protecting a critical PDU session among NF nodes (refer to FIG. 7) included in the communication system of the present embodiment, and omits illustration of some NF nodes included in the communication system.

As described above, the AF node 10 acquires the PDU session ID and the beam group information in association with each other from the base station device 20 via the API. Therefore, as illustrated in FIG. 18, the base station device 20 includes an API interface. This makes it possible for the base station device 20 to communicate with the AF node 10 via the API.

Figure 19:
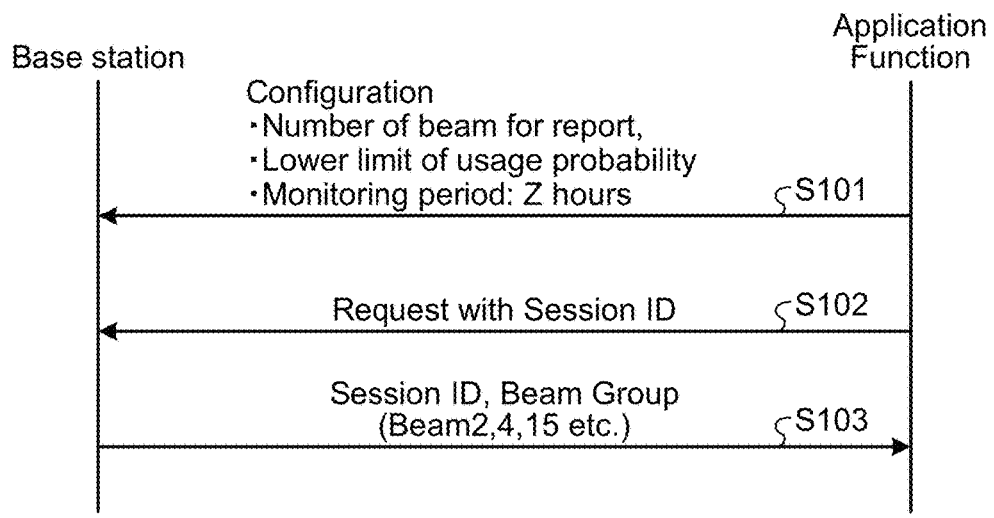
FIG. 19 is a sequence diagram illustrating a procedure of beam group information acquisition processing according to the embodiment of the present disclosure.

In such a communication system, a procedure of acquiring beam group information associated with a PDU session will be described with reference to FIG. 19. FIG. 19 is a sequence diagram illustrating a procedure of beam group information acquisition processing according to the embodiment of the present disclosure.

As illustrated in FIG. 19, an application function (AF) node 10 notifies the base station device 20 of a configuration including an upper limit of the number of beams to be included in the beam group information, a lower limit value of the usage probability, and a certain monitoring period (for example, Z hours) of usage probability (step S101).

Next, the AF node 10 designates a session ID of a PDU session and requests output of beam group information (step S102). Having received such a request, the base station device 20 transmits the beam group information to the AF node 10 in association with the session ID of the PDU session based on the configuration notified in step S101 (step S103). In the example of FIG. 19, the base station device 20 transmits beam information regarding the beam 2, the beam 4, and the beam 15 as the beam group information.

Figure 20:
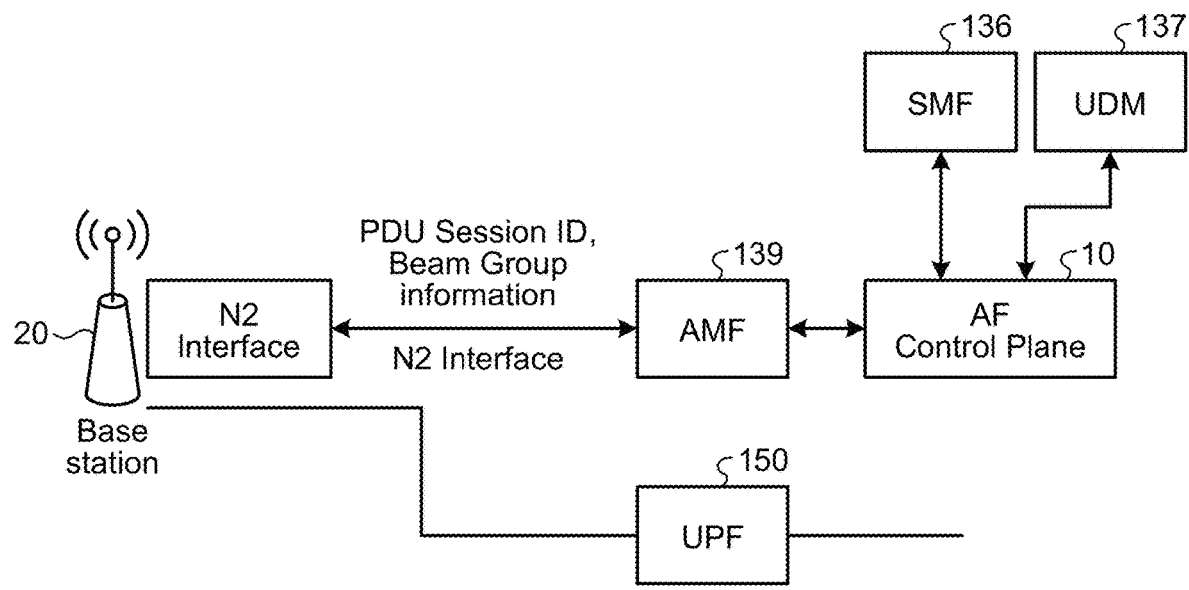
FIG. 20 is a diagram illustrating another configuration example of the communication system according to the embodiment of the present disclosure.

Note that the base station device 20 described above includes the API interface and directly transmits and receives messages to and from the AF node 10, but the transmission/reception method not limited thereto. For example, the base station device 20 may transmit and receive messages to and from the AF node 10 via a core network node (for example, the AMF node 139). A configuration example of a communication system in this case will be described with reference to FIG. 20. FIG. 20 is a diagram illustrating another configuration example of the communication system according to the embodiment of the present disclosure. Note that FIG. 20 illustrates an NF node related to the interference control processing for protecting a critical PDU session among NF nodes (refer to FIG. 7) included in the communication system of the present embodiment, and omits illustration of some NF nodes included in the communication system.

Figure 21:
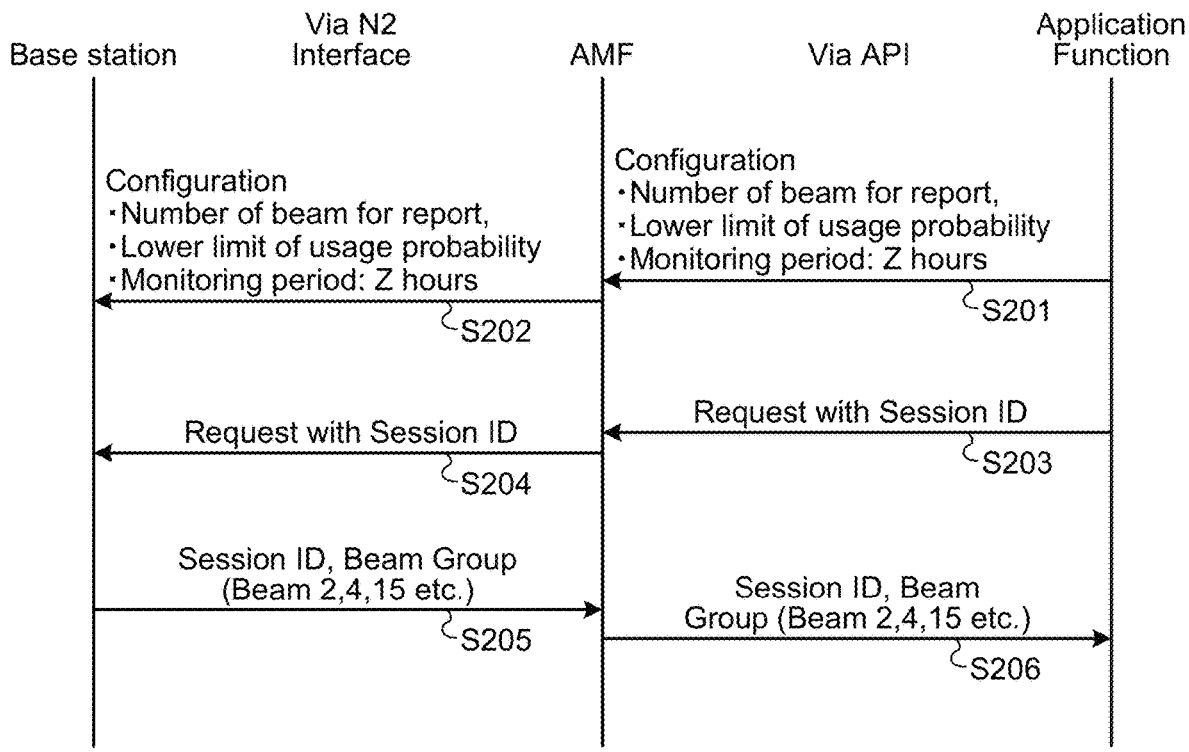
FIG. 21 is a sequence diagram illustrating a procedure of beam group information acquisition processing according to the embodiment of the present disclosure.

As described above, the AF node 10 acquires the PDU session ID and the beam group information in association with each other from the base station device 20 via the core network node (for example, the AMF node 139). As illustrated in FIG. 21, the base station device 20 and the AMF node 139 are connected to each other via an N2 interface. Furthermore, the AF node 10 is connected to the AMF node 139 via an API interface.

In such a communication system, a procedure of acquiring beam group information associated with a PDU session will be described with reference to FIG. 21. FIG. 21 is a sequence diagram illustrating a procedure of beam group information acquisition processing according to the embodiment of the present disclosure.

As illustrated in FIG. 21, the application function (AF) node 10 notifies the AMF node 139 of a configuration including an upper limit of the number of beams to be included in the beam group information, a lower limit value of the usage probability, and a monitoring period (for example, Z hours) of the usage probability (step S201). The AMF node 139 transfers the received configuration to base station device 20 (step S202).

Next, the AF node 10 designates the session ID of the PDU session and transmits an output request of the beam group information to the AMF node 139 (step S203). The AMF node 139 transfers the received output request to the base station device 20 (step S204).

Having received the output request, the base station device 20 transmits the beam group information to the AMF node 139 in association with the session ID of the PDU session based on the configuration received in step S202 (step S205). The AMF node 139 transfers the received beam group information to the AF node 10 (step S206). In the example of FIG. 21, the beam group information includes beam information related to the beam 2, the beam 4, and the beam 15.

In this manner, the AF node 10 can also acquire group beam information via the AMF node 139.

As described above, the AF node 10 acquires, from the base station device 20, information regarding at least one beam associated with the PDU session. This allows the AF node 10 to specify beams that suppress interference so as to protect critical PDU sessions. By suppressing interference with a specified beam, the AF node 10 can protect a critical PDU session from inter-beam interference, which is difficult only by QoS control. Note that the AMF node 139 may be another core network node (for example, UPF, SMF, or NEF).

<4.2. Designation of Output Information>

Although the above-described AF node 10 designates information (for example, a session ID) identifying a PDU session and requests acquisition of the group beam information, the request operation is not limited thereto. For example, the AF node 10 may request acquisition of group beam information associated with all PDU sessions without designating information identifying PDU sessions. Even when the AF node 10 has acquired information identifying a specific PDU session, it has been sometimes difficult to specify through which base station device 20 communication is performed in the acquired PDU session. In particular, the more the number of base station devices 20 connected to the core network, the more difficult to specify the base station device 20 that is performing communication in a specific PDU session.

In view of this, the AF node 10 requests acquisition of the group beam information without designating the PDU session. That is, the AF node 10 requests the base station device 20 to output the group beam information of all PDU sessions.

Figure 22:
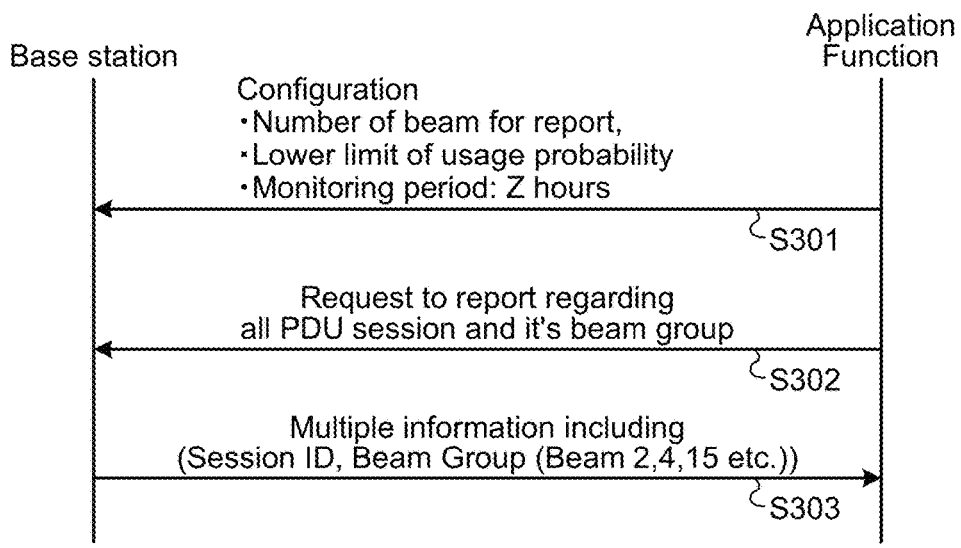
FIG. 22 is a sequence diagram illustrating a procedure of beam group information acquisition processing according to the embodiment of the present disclosure.

A processing procedure in a case where the AF node 10 requests output of group beam information corresponding to all PDU sessions will be described with reference to FIG. 22. FIG. 22 is a sequence diagram illustrating a procedure of beam group information acquisition processing according to the embodiment of the present disclosure.

As illustrated in FIG. 22, an application function (AF) node 10 notifies the base station device 20 of a configuration including an upper limit of the number of beams to be included in the beam group information, a lower limit value of the usage probability, and a monitoring period (for example, Z hours) of usage probability (step S301).

Next, the AF node 10 requests output of beam group information (step S302). At this time, the AF node 10 requests an output without designating a PDU session, in other words, without including a PDU session ID. In this manner, the AF node 10 requests output of beam group information corresponding to all PDU sessions of the base station device 20.

Upon receiving such a request, based on the configuration notified in step S101, the base station device 20 transmits the beam group information to the AF node 10 in association with the session ID of the PDU session for all the PDU sessions (step S303).

<4.3. Beam ID>

As described above, based on the acquired beam group information, the AF node 10 determines which beam is to be protected from interference and which beam is not to be used for interference suppression. The beam to be determined is not limited to the beam used by one base station device 20, and may be a beam used by a different base station device 20 or a base station device 20 of a different PLMN. Therefore, by grasping which base station device 20 uses the beam, the AF node 10 can appropriately designate a beam to be subjected to interference control.

Therefore, in the communication system according to the present embodiment, a number (beam identification ID) identifying a beam is defined as a universal beam ID (or global beam ID) that can be uniquely identified regardless of the PLMN or the base station device 20.

For example, the universal beam ID used by the AF node 10 is set as Universal Beam ID=PLMN ID+ID of the base station device 20+Local Beam ID used in the base station device 20.

Alternatively, for example, the universal beam ID used by the AF node 10 may be Universal Beam ID=PLMN ID+NGRAN Cell Global Identity (NCGI) +SSB ID (identifier of a synchronization beam).

Note that the universal beam ID may be generated by the base station device 20, and the PDU session ID and the universal beam ID may be returned as a response to the AF node 10 by the API.

Alternatively, the AF node 10 may acquire a local beam ID that is not universal from the base station device 20 and generate Universal Beam ID from the acquired local beam ID. In this case, the AF node 10 acquires an ID of a PLMN or the base station device 20 from another NF node, for example, and generates the Universal Beam ID.

By acquiring an international mobile subscriber identity (IMSI) from the universal beam ID, for example, the AF node 10 can acquire information in which a SUPI (IMSI) is associated with a universal beam ID.

In this manner, by setting the beam ID used by the AF node 10 to the universal beam ID, the AF node 10 can uniquely identify a beam to be subjected to interference control. Therefore, even when there are different PLMNs or different base station devices 20, the AF node 10 can appropriately associate the IMSI with the beam, achieving appropriate designation of the beam to be subjected to the interference control.

<4.4. Association Between SUPI and Beam ID>

As described above, the beam group information is acquired from the base station device 20, enabling the AF node 10 to identify the beam used in the PDU session. However, the PDU session is terminated when communication is stopped, and thus, the time during which the information regarding the PDU session is valid varies depending on the communication time, and the time might be several seconds, for example. When one PDU session ends in a few seconds and another communication starts, another PDU session with another PDU session ID is established, and a beam required for the established another PDU session is used.

Therefore, even after the AF node 10 has acquired information regarding the PDU session and the beam, the time during which the acquired information is valid might be very short. In such a case, even if the AF node 10 adjusts which beam to use with another base station device 20, the period during which the information is valid might expire before the adjustment, leading to wasteful adjustment.

By inquiring the UDM node 137 with the PDU session ID as a Key, the AF node 10 can grasp whether the PDU session is Active or Released. However, in a case where the beam information that the AF node 10 has acquired has been associated with a PDU session that has been released, the acquisition is considered to be too late, or not in time.

In view of this, the AF node 10 according to the present embodiment associates, instead of the PDU session, the SUPI (alternatively, IMSI being an example of subscriber information identifying a subscriber) with beam information, and performs interference control so as to protect the PDU session of the critical SUPI established at that time.

Since the association between the SUPI and the beam information is made for a specific user, it is possible to associate the SUPI and the PDU session ID. For example, the 5GG SMF node 136 has a correspondence table indicating which PDU sessions are related to SUPI. On the other hand, the base station device 20 manages the PDU session ID or the NG-U Tunnel ID, but does not manage the correspondence of the SUPI number to the PDU session.

As described above, the AF node 10 acquires the PDU session ID information and the beam ID information from the base station device 20 via the API. Even with the desire on the AF node 10 that has acquired the information to make an inquiry to the SMF node 136 about which SUPI the obtained PDU session is associated with, the SMF node 136 has no function of extracting IMSI from the PDU session. The SMF node 136 has a function of outputting PDU session information from the SUPI.

More specifically, the AF node 10 may obtain the PDU session ID corresponding to the SUPI from the SMF node 136 by using Nsmf_PDUSession_ContextRequest service operation disclosed in TS 23.502 Section 5.2.8.2.10.

Therefore, the AF node 10 can obtain the relationship between the SUPI and the PDU session ID by making an inquiry to the SMF node 136 by using all the SUPI held by the UDM node 137, for example. The AF node 10 associates the SUPI with the beam based on the relationship and the correspondence between the PDU session ID and the beam information acquired from the base station device 20 or another core network node.

Here, the UDM node 137 has information regarding the terminal device 40, but cannot output the SUPI by using the PDU session ID as a Key. Therefore, the AF node 10 acquires information of the PDU session ID from the SMF node 136 based on the SUPI. The AF node 10 collects the PDU session ID information to generate a table for acquiring the SUPI information from the PDU session, for example.

Hereinafter, an example of a table to be generated by the AF node 10 will be described with reference to FIGS. 23 to 26. FIG. 23 is a diagram illustrating an example of information held by the base station device 20 according to the embodiment of the present disclosure. FIG. 24 is a diagram illustrating an example of information held by the SMF node 136 according to the embodiment of the present disclosure. FIGS. 25 and 26 are diagrams illustrating an example of information generated by the AF node 10 according to the embodiment of the present disclosure.

As illustrated in FIG. 23, the base station device 20 holds PDU session ID with beam ID, more specifically, holds PDU session ID and a beam ID group including a plurality of beam IDs. When having received an input with the PDU session ID as a Key, the base station device 20 outputs a corresponding beam ID group.

As illustrated in FIG. 24, the SMF node 136 holds the SUPI and the PDU session ID in association with each other. When having received an input with the SUPI as the Key, the SMF node 136 outputs the corresponding PDU session ID.

The AF node 10 acquires the beam ID corresponding to the PDU session ID from the base station device 20, and acquires the PDU session ID corresponding to the SUPI from the SMF node 136. With this configuration, the AF node 10 can acquire the relationship between the SUPI and the beam ID as illustrated in FIG. 25.

Note that the beam group information acquired by the AF node 10 from the base station device 20, for example, includes a measurement period (for example, the latest Z hours) in which the beam usage probability and the usage probability are calculated, for example, in addition to the beam ID corresponding to the PDU session ID. Therefore, in addition to the beam ID, the AF node 10 can acquire the beam usage probability and the measurement period in association with the SUPI as illustrated in FIG. 26, for example.

This makes it possible for the AF node 10 to acquire beam group information corresponding to the SUPI. Since SUPI (or IMSI) is a number included in the SIM of the terminal device 40, the AF node 10 can grasp which beam is to be used by the SIM of the terminal device 40 used as a communication device of a critical machine in a factory, for example. In this manner, since SUPI (or IMSI) is not an ID used or discarded by communication like a PDU session ID, the AF node 10 can perform interference control regardless of the communication status of the terminal device 40, leading to high convenience to use.

Figure 27:
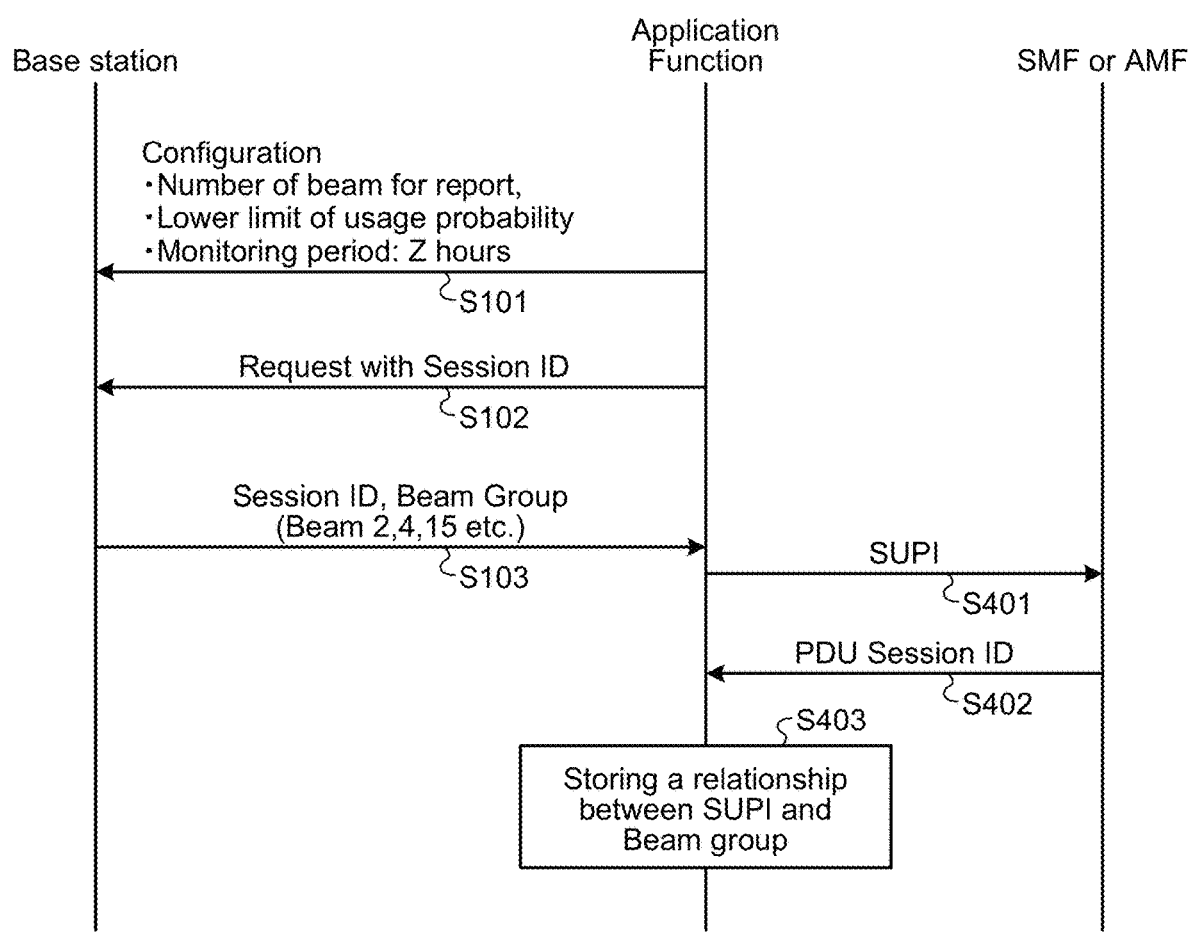
FIG. 27 is a sequence diagram illustrating a procedure of beam group information acquisition processing according to the embodiment of the present disclosure.

Here, a procedure of associating the SUPI and the beam group information with each other will be described with reference to FIG. 27. FIG. 27 is a sequence diagram illustrating a procedure of beam group information acquisition processing according to the embodiment of the present disclosure. Note that the procedure before the AF node 10 acquires the beam group information is the same as the procedure illustrated in FIG. 19, and thus the description thereof is omitted.

As illustrated in FIG. 27, the application function (AF) node 10 that has acquired the beam group information inquires of the SMF node 136 about the PDU session ID using the SUPI as a Key (step S401). In response to the inquiry from the AF node 10, the SMF node 136 returns a PDU session ID corresponding to the SUPI (step S402).

The AF node 10 holds the SUPI and the beam group information in association with each other based on the acquired PDU session ID and beam group information (step S401).

Here, although the PDU session ID is to be acquired from the SMF node 136 using SUPI as a Key, the PDU session ID can be similarly acquired from the AMF node 139 (refer to TS23.502 Table 5.2.2.2.2-1: UE Context in AMF). Accordingly, the SMF node 136 described above may be replaced with the AMF node 139.

<4.5. Interference Control>

Conventionally, interference control of suppressing beam interference has been implemented on the base station device 20, and methods of implementation onto the base station device 20 depend on an implementation side of the base station device 20. Therefore, for example, in a case where a company that implements the base station device 20 is different from a company that installs the base station device 20 and operates a network such as private 5G, or the like, there is a case where the network operating company does not know the type of interference control implemented on the base station device 20. In this case, when the network operating company desires to arrange the base station device 20 so as to suppress the beam interference, it is difficult to arrange the base station device 20 so as to suppress the beam because the company does not know the type of interference control performed by the base station device 20.

In this manner, it is practically difficult to perform interference control on the base station device 20, and it is desired to arrange, in addition to the base station device 20, an NF node and the AF node 10 having a management function specialized for interference control to achieve central management of interference control.

Therefore, in the present embodiment, based on the group beam information acquired from the base station device 20 via the API, the AF node 10 specifies identification information of a beam to be used in a PDU session to be protected and a beam that would interfere with the beam. The AF node 10 determines to stop the beam specified as an interfering beam.

As described above, the AF node 10 acquires the relationship between the PDU session and the beam or the relationship between the SUPI and the beam. Furthermore, the AF node 10 acquires, from the base station device 20, information regarding an interfering beam that would interfere with a predetermined beam.

Because PDU sessions are associated with the QoS, the AF node 10 can specify critical and non-critical PDU sessions. The AF node 10 that has specified a non-critical PDU session then specifies a beam associated with the specified PDU session, and requests the base station device 20 to stop using the beam specified using the beam ID.

Alternatively, the AF node 10 that has specified the critical PDU session may specify an interfering beam that would interfere with the beam associated with the critical PDU session. The AF node 10 requests the base station device 20 to stop using the interfering beam by using the beam ID.

In addition, the SUPI is associated with the terminal device 40. For example, when the user of the terminal device 40 pre-registers the critical terminal device 40 and the non-critical terminal device 40, the AF node 10 can specify the importance of the terminal device 40. The AF node 10 specifies a beam associated with the SUPI of the terminal device 40 that is non-critical, and requests the base station device 20 to stop using the beam using the beam ID.

Alternatively, the AF node 10 may specify an interfering beam that interferes with a beam associated with the SUPI of the critical terminal device 40, and may request the base station device 20 to stop using the interfering beam specified using the beam ID. Here, the request to the base station device 20 may be made via a core network node. For example, an instruction may be given to the core network node via the API, and the core network node may give an instruction to the base station device 20 via an interface (for example, an NG interface or an S1 interface) for interaction with the base station device 20.

Note that the beam ID used here is the above-described universal beam ID, for example.

The number of beams for which the AF node 10 requests the stop of usage is one beam or a plurality of beams. The AF node 10 may request the base station device 20 to stop a plurality of beams using a beam group including a plurality of beam IDs, for example. Alternatively, the AF node 10 may input the S-NSSI to the base station device to request the base station device 20 to stop all related beams. Furthermore, the AF node 10 may request the base station device 20 to stop the beam by confirming agreement based on a plurality of use methods.

Figure 28:
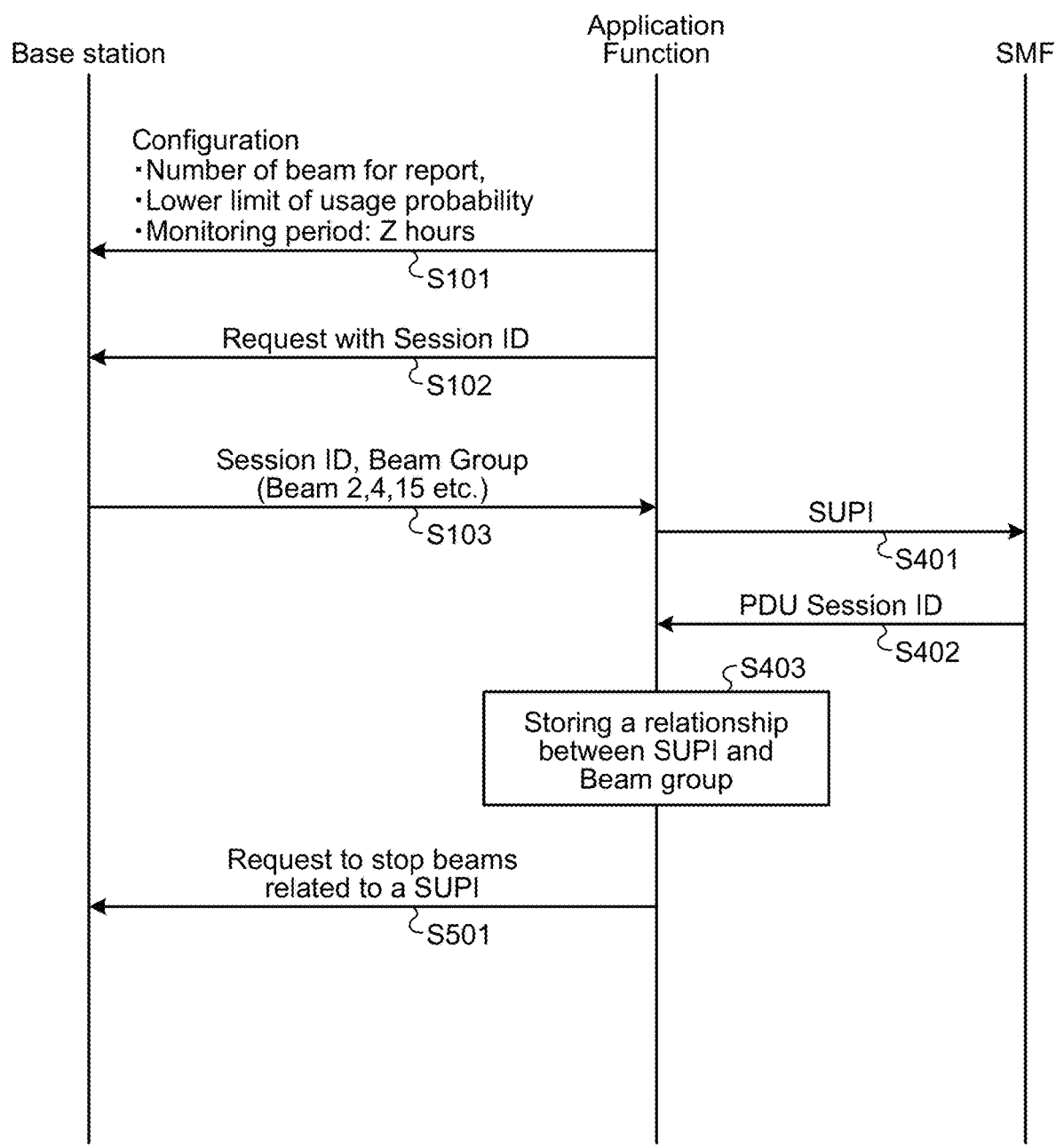
FIG. 28 is a sequence diagram illustrating a procedure of interference control processing according to the embodiment of the present disclosure.

Here, a procedure of interference control by the AF node 10 will be described with reference to FIG. 28. FIG. 28 is a sequence diagram illustrating a procedure of interference control processing according to the embodiment of the present disclosure. Here, although the following will describe interference control processing for protecting a critical terminal device (for example, SUPI), the SUPI may be a PDU session. Since the procedure until the AF node 10 associates the SUPI with the beam group information is the same as the procedure illustrated in FIG. 28, the description thereof will be omitted.

As illustrated in FIG. 28, the acquired application function (AF) node 10 in which the SUPI and the beam group information are associated with each other specifies critical SUPI and non-critical SUPI, and requests the base station device 20 to stop using a beam corresponding to the non-critical SUPI (step S501).

This makes it possible for the base station device 20 to stop using beams used by the non-critical SUPI, leading to suppression of interference to the beam used by the critical SUPI.

Here, although the AF node 10 specifies a non-critical SUPI, the specifying method is not limited thereto. For example, the AF node 10 may specify all SUPIs other than the critical SUPI as the non-critical SUPI, and may request the base station device 20 to stop using beams used by all the specified SUPIs.

<<5. Other Embodiments>>

The above-described embodiment is an example, and various modifications and applications are possible.

In the above-described embodiment, the AF node 10 acquires the interfering beam information in advance, and the beam to be stopped is specified using the interfering beam information. However, operation regarding the beam is not limited thereto. For example, when transmitting the group beam information used in the PDU session, the base station device 20 may include, in the group beam information, interfering beam information that would interfere with a beam included in the group beam information, and may transmit the group beam information including the interfering beam information. Alternatively, the AF node 10 that has specified the beam to be protected in the critical PDU session may inquire of the base station device 20 about the interfering beam that would interfere with the specified beam.

The AF node 10 may acquire the interfering beam information directly from the base station device 20 by using API, for example, or may acquire the interfering beam information from the base station device 20 via the SMF node 136 or the AMF node 139.

The beams in some embodiments described above include directional beams and omnidirectional beams. The signal (sequence) by which the beam is formed may be a synchronization signal/BPCH block (SSB) or a Chanel State Information Reference Signal (CSI-RS). That is, the interfering beam information or the desired beam information described above may be identification information of the SSB or the CSI-RS (e.g., SSB Index, or CRI).

The control device that controls the NF node, the base station device 20, or the terminal device 40 of the present embodiment may be implemented by a dedicated computer system or a general-purpose computer system.

For example, a communication program for executing the above-described operations (for example, the transmission and reception processing) is stored in a computer-readable recording medium such as an optical disk, semiconductor memory, a magnetic tape, or a flexible disk and distributed. For example, the program is installed on a computer and the above processing is executed to achieve the configuration of the control device. At this time, the control device may be a device (for example, a personal computer) outside each NF node, the base station device 20, or the terminal device 40. Furthermore, the control device may be a device (for example, the control unit 13, the control unit 23, or the control unit 45) inside each NF node, the base station device 20, or the terminal device 40.

Furthermore, the communication program may be stored in a disk device included in a server device on a network such as the Internet so as to be able to be downloaded to a computer, for example. Furthermore, the functions described above may be implemented by using operating system (OS) and application software in cooperation. In this case, the sections other than the OS may be stored in a medium for distribution, or the sections other than the OS may be stored in a server device so as to be downloaded to a computer, for example.

Furthermore, among individual processing described in the above embodiments, all or a part of the processing described as being performed automatically may be manually performed, or the processing described as being performed manually can be performed automatically by known methods. In addition, the processing procedures, specific names, and information including various data and parameters illustrated in the above Literatures or drawings can be arbitrarily altered unless otherwise specified. For example, various types of information illustrated in each of the drawings are not limited to the information illustrated.

In addition, each of components of each device is provided as a functional and conceptional illustration and thus does not necessarily need to be physically configured as illustrated. That is, the specific form of distribution/integration of each of the devices is not limited to those illustrated in the drawings, and all or a part thereof may be functionally or physically distributed or integrated into arbitrary units according to various loads and use conditions.

Furthermore, the above-described embodiments can be appropriately combined within a range implementable without contradiction of processing. Furthermore, the order of individual steps illustrated in the sequence diagram of each of the above embodiments can be altered as appropriate.

Furthermore, for example, the present embodiment can be implemented as any configuration constituting a device or a system, for example, a processor as a large scale integration (LSI) or the like, a module using a plurality of processors or the like, a unit using a plurality of modules or the like, and a set obtained by further adding other functions to the unit, or the like (that is, a configuration of a part of the device).

In the present embodiment, a system represents a set of a plurality of components (devices, modules (components), or the like), and whether all the components are in the same housing would not be a big issue. Therefore, a plurality of devices housed in separate housings and connected via a network, and one device in which a plurality of modules are housed in one housing, are both systems.

Furthermore, for example, the present embodiment can adopt a configuration of cloud computing in which one function is cooperatively shared and processed by a plurality of devices via a network.

<6. Supplementary Notes>

The preferred embodiments of the present disclosure have been described in detail above with reference to the accompanying drawings. However, the technical scope of the present disclosure is not limited to such examples. It will be apparent to those skilled in the art of the present disclosure that various modifications and alterations can be conceived within the scope of the technical idea described in the claims and naturally fall within the technical scope of the present disclosure.

Among the processing described in the above embodiments, all or a part of the processing described as being performed automatically may be manually performed, or the processing described as being performed manually can be performed automatically by known methods. In addition, the processing procedures, specific names, and information including various data and parameters illustrated in the above Literatures or drawings can be arbitrarily altered unless otherwise specified. For example, various types of information illustrated in each of the drawings are not limited to the information illustrated.

In addition, each of components of each device is provided as a functional and conceptional illustration and thus does not necessarily need to be physically configured as illustrated. That is, the specific form of distribution/integration of each of the devices is not limited to those illustrated in the drawings, and all or a part thereof may be functionally or physically distributed or integrated into arbitrary units according to various loads and use conditions.

Furthermore, the above-described embodiments can be appropriately combined within a range implementable without contradiction of processes.

Furthermore, the effects described in the present specification are merely illustrative or exemplary and are not limited. That is, the technology according to the present disclosure can exhibit other effects that are apparent to those skilled in the art from the description of the present specification in addition to or instead of the above effects.

Note that the following configurations also belong to the technical scope of the present disclosure.

(1)

A base station device comprising a control unit that performs operations including:

receiving an acquisition request, which is a request for acquiring beam information related to a PDU session established with a terminal device; and transmitting beam group information including at least one piece of the beam information, the transmission being performed in association with the PDU session in response to the acquisition request.

(2)

The base station device according to (1), wherein the control unit requests release of a PDU session using an interfering beam that interferes with a beam included in the beam information or stop of traffic in accordance with the beam information and the interfering beam.

(3)

The base station device according to (1) or (2)

wherein the control unit receives the acquisition request via an application programming interface (API), and transmits the beam group information via the API.

(4)

The base station device according to (1) or (2), wherein the control unit receives the acquisition request from an AMF node via an N2 interface, and transmits the beam group information to the AMF node via the N2 interface, and the AMF node receives the acquisition request from an application function (AF) node via an application programming interface (API), and transmits the beam group information to the application function node.

(5)

The base station device according to any one of (1) to (4), wherein the acquisition request includes identification information for identifying a PDU session, and the control unit transmits the beam group information associated with the PDU session identified by the identification information.

(6)

The base station device according to (5), wherein the identification information includes at least one of a PDU session ID, a QoS Flow Identifier, an IP 5-tuple, and a network slice ID.

(7)

The base station device according to any one of (1) to (4), wherein the control unit transmits, in response to the acquisition request, the beam group information associated with each of all the PDU sessions established with the terminal device connected to the base station device.

(8)

The base station device according to any one of (1) to (7), wherein the beam information includes information regarding a beam used in at least one of a fixed time period and a predetermined probability in the PDU session.

(9)

The base station device according to any one of (1) to (8), wherein the beam group information includes beam information having a possibility to be used in the PDU session or beam information regarding a predetermined number of beams out of used beams.

(10)

The base station device according to any one of (1) to (9), wherein the beam information includes beam identification information for uniquely identifying a beam.

(11)

The base station device according to any one of (1) to (10), wherein the control unit acquires subscriber information identifying a subscriber corresponding to the PDU session, and associates the subscriber information with the beam information.

(12)

The base station device according to (11), wherein the control unit requests to stop use of the interfering beam in a communication with a terminal device using the interfering beam in accordance with the beam information, an interfering beam that interferes with a beam included in the beam information, and the subscriber information.

(13)

An application function node comprising a control unit that performs operations including:

transmitting, to a base station device connected to a terminal device, an acquisition request of requesting acquisition of beam information related to a PDU session established with the terminal device; and receiving beam group information, which is associated with the PDU session and includes at least one piece of the beam information, from the base station device.

(14)

The application function node according to (13), wherein the control unit determines a PDU session to be released in accordance with received beam group information and interfering beam information regarding a beam that interferes with a terminal device that performs communication in the PDU session corresponding to the beam group information.

(15)

A communication method comprising:

receiving an acquisition request, which is a request for acquiring beam information related to a PDU session established with a terminal device; and transmitting beam group information including at least one piece of the beam information, the transmission being performed in association with the PDU session in response to the acquisition request.

(16)

A communication method comprising:

transmitting, to a base station device connected to a terminal device, an acquisition request of requesting acquisition of beam information related to a PDU session established with the terminal device; and receiving beam group information, which is associated with the PDU session and includes at least one piece of the beam information, from the base station device.

REFERENCE SIGNS LIST

10 AF NODE
11 COMMUNICATION UNIT
12, 22 STORAGE UNIT
13, 23 CONTROL UNIT
20 BASE STATION DEVICE
21 SIGNAL PROCESSING UNIT
40 TERMINAL DEVICE

The invention claimed is:

1. A base station device comprising a control circuit that performs operations including:
receiving an acquisition request from an application function node, the acquisition request comprising a request for acquiring beam information related to a packet data unit (PDU) session currently established with a terminal device; and
in response to the acquisition request, transmitting, to the application function node, beam group information that includes the beam information, the beam group information being associated with the PDU session currently established with the terminal device,
wherein, in response to the acquisition request, the control circuit also transmits a request to a session management function (SMF) node for one of:
a release of a second PDU session managed by the SMF node, the second PDU session using a beam that interferes with a beam used in the PDU session currently established with the terminal device, or
a stop of traffic in the beam that interferes with the beam used in the PDU session currently established with the terminal device,
wherein the PDU session currently established with the terminal device is one of a plurality of PDU sessions managed by the base station device, and
wherein the control circuit:
acquires subscriber information identifying a subscriber corresponding to each of the plurality of PDU sessions managed by the base station device, and
associates the subscriber information with beam information for each of the plurality of PDU sessions managed by the base station device, and
wherein the beam information includes subscriber information corresponding to the PDU session currently established with the terminal device, and
wherein the request for the one of the release of the second PDU session or the stop of traffic comprises subscriber information corresponding to the second PDU session.

2. The base station device according to claim 1, wherein the control circuit receives the acquisition request via an application programming interface (API), and transmits the beam group information via the API.

3. The base station device according to claim 1, wherein the control circuit receives the acquisition request from the application function node via an Access and Mobility Management Function (AMF) node via an N2 interface, and transmits the beam group information to the application function node via the AMF node via the N2 interface.

4. The base station device according to claim 1, wherein the acquisition request includes identification information for identifying the PDU session currently established with the terminal device, and
the control circuit transmits the beam group information associated with the PDU session identified by the identification information.

5. The base station device according to claim 4, wherein the identification information includes at least one of a PDU session identifier (ID), a quality of service (QoS) Flow Identifier, an internet protocol (IP) 5-tuple, and a network slice ID.

6. The base station device according to claim 1, wherein the PDU session currently established with the terminal device is one of a plurality of PDU sessions managed by the base station device, and
wherein the beam group information transmitted by the control circuit includes beam group information associated with all of the plurality of PDU sessions managed by the base station device.

7. The base station device according to claim 1, wherein the beam information includes information regarding the beam used in the PDU session currently established with the terminal device, the beam being used in the PDU session in at least one of a fixed time period or being used with a predetermined probability.

8. The base station device according to claim 1, wherein the beam group information further includes information regarding a second beam that is a candidate for use in the PDU session currently established with the terminal device or information regarding a predetermined number of beams out of a plurality of beams that are used in the PDU session currently established with the terminal device.

9. The base station device according to claim 1, wherein the beam information includes beam identification information for uniquely identifying the beam used in the PDU session currently established with the terminal device.

10. A communication method performed by a base station device and comprising:
receiving an acquisition request from an application function node, the acquisition request comprising a request for acquiring beam information related to a packet data unit (PDU) session currently established with a terminal device; and
in response to the acquisition request, transmitting, to the application function node, beam group information that includes the beam information, the beam group information being associated with the PDU session currently established with the terminal device,
wherein, in response to the acquisition request, the method further includes transmitting a request to a session management function (SMF) node for one of:
a release of a second PDU session managed by the SMF node, the second PDU session using a beam that interferes with a beam used in the PDU session currently established with the terminal device, or
a stop of traffic in the beam that interferes with the beam used in the PDU session currently established with the terminal device,
wherein the PDU session currently established with the terminal device is one of a plurality of PDU sessions managed by the base station device, and
wherein the communication method further comprises:
acquiring subscriber information identifying a subscriber corresponding to each of the plurality of PDU sessions managed by the base station device, and associating the subscriber information with beam information for each of the plurality of PDU sessions managed by the base station device, and
wherein the beam information includes subscriber information corresponding to the PDU session currently established with the terminal device, and
wherein the request for the one of the release of the second PDU session or the stop of traffic comprises subscriber information corresponding to the second PDU session.

* * * * *